United States Patent
Nakano et al.

(10) Patent No.: US 9,543,802 B2
(45) Date of Patent: Jan. 10, 2017

(54) MOTOR DRIVE APPARATUS

(75) Inventors: Masatsugu Nakano, Chiyoda-ku (JP);
Yoshihito Asao, Chiyoda-ku (JP); Isao Sonoda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 768 days.

(21) Appl. No.: 13/990,852

(22) PCT Filed: Mar. 4, 2011

(86) PCT No.: PCT/JP2011/055053
§ 371 (c)(1),
(2), (4) Date: May 31, 2013

(87) PCT Pub. No.: WO2012/120588
PCT Pub. Date: Sep. 13, 2012

(65) Prior Publication Data
US 2013/0249356 A1  Sep. 26, 2013

(51) Int. Cl.
*H02K 5/22* (2006.01)
*H02K 5/24* (2006.01)
*H02K 9/22* (2006.01)

(52) U.S. Cl.
CPC *H02K 5/22* (2013.01); *H02K 5/24* (2013.01); *H02K 11/33* (2016.01); *H02K 9/22* (2013.01)

(58) Field of Classification Search
CPC .............. H02K 5/22; H02K 11/33; H02K 5/24
USPC ............................................ 310/68 D, 88, 89
See application file for complete search history.

(56) References Cited

U.S. PATENT DOCUMENTS

| 6,577,030 | B2 | 6/2003 | Tominaga et al. |
| 7,834,498 | B2 | 11/2010 | Shiino et al. |
| 2002/0060105 | A1 | 5/2002 | Tominaga et al. |
| 2003/0090223 | A1* | 5/2003 | Nishizawa ............. G01D 3/022 318/268 |
| 2006/0006749 | A1 | 1/2006 | Sasaki et al. |

(Continued)

FOREIGN PATENT DOCUMENTS

| JP | 2000-23417 A | 1/2000 |
| JP | 2001-54271 A | 2/2001 |

(Continued)

OTHER PUBLICATIONS

Communication dated Feb. 5, 2016 from the European Patent Office in counterpart application No. 11860588.0.

(Continued)

*Primary Examiner* — Terrance Kenerly
(74) *Attorney, Agent, or Firm* — Sughrue Mion, PLLC; Richard C. Turner

(57) ABSTRACT

A motor drive control apparatus 30, on which a switching element 73 for performing drive control of the motor 10 is mounted, includes: a heat sink 50 placed on the front side or rear side of the motor; and a housing 40 that is coupled to the heat sink and couples the heat sink to the frame or that covers the switching element mounted on the heat sink, and wherein an abutment surface 110 between the housing and the heat sink is located on a single plane intersecting with the direction of the rotation axis of the motor, and screw holes 42 and 52 for coupling the frame, the heat sink and the housing to each other are provided such that the positions in the circumferential direction of the screw holes 42 and 52 correspond to each other.

20 Claims, 14 Drawing Sheets

(56) References Cited

U.S. PATENT DOCUMENTS

| | | | | |
|---|---|---|---|---|
| 2009/0001832 A1* | 1/2009 | Ishihara | ................ | H01R 39/06 |
| | | | | 310/128 |
| 2009/0021091 A1 | 1/2009 | Shiino et al. | | |
| 2010/0026128 A1* | 2/2010 | Ionel | ..................... | H02K 1/276 |
| | | | | 310/156.53 |
| 2010/0327678 A1 | 12/2010 | Yamasaki et al. | | |

FOREIGN PATENT DOCUMENTS

| | | |
|---|---|---|
| JP | 2002-120739 A | 4/2002 |
| JP | 2009-23418 A | 2/2009 |
| JP | 2009-248796 A | 10/2009 |
| JP | 2009-248864 A | 10/2009 |

OTHER PUBLICATIONS

Communication dated Mar. 16, 2015, issued by the State Intellectual Property Office of P.R. China in counterpart Chinese application No. 201180068858.6.

International Search Report for PCT/JP2011/055053 dated May 24, 2011.

\* cited by examiner

F I G. 7
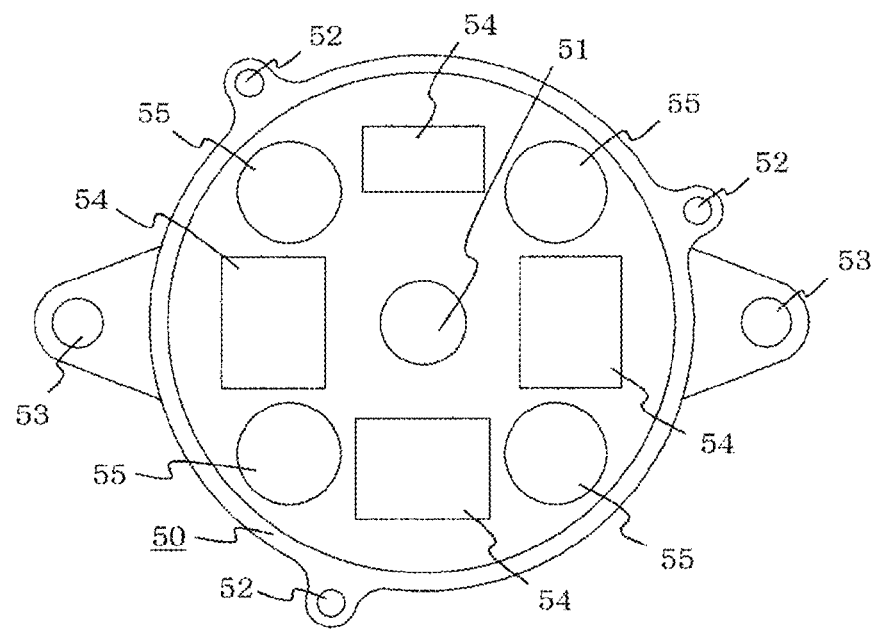
F I G. 8
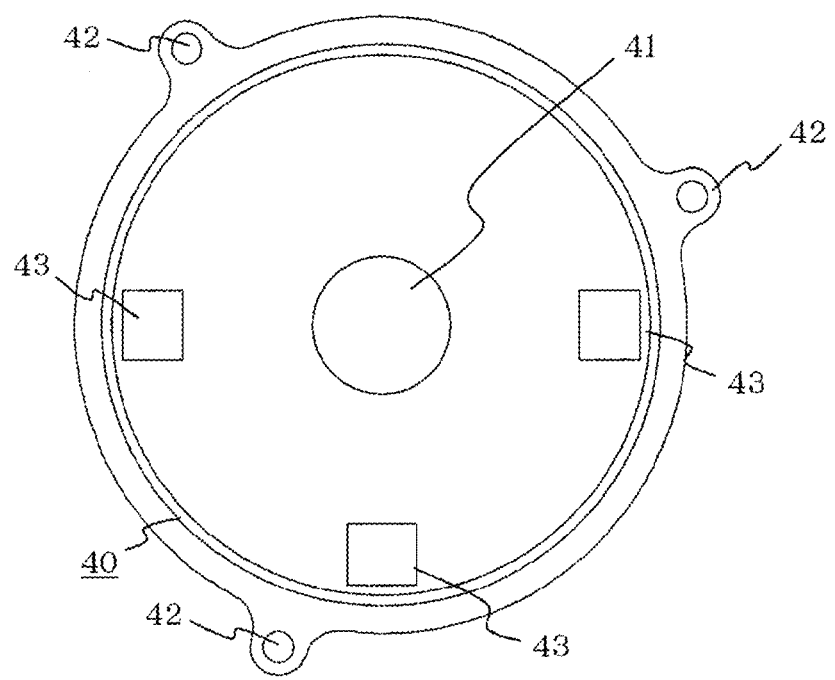

F I G. 1 5
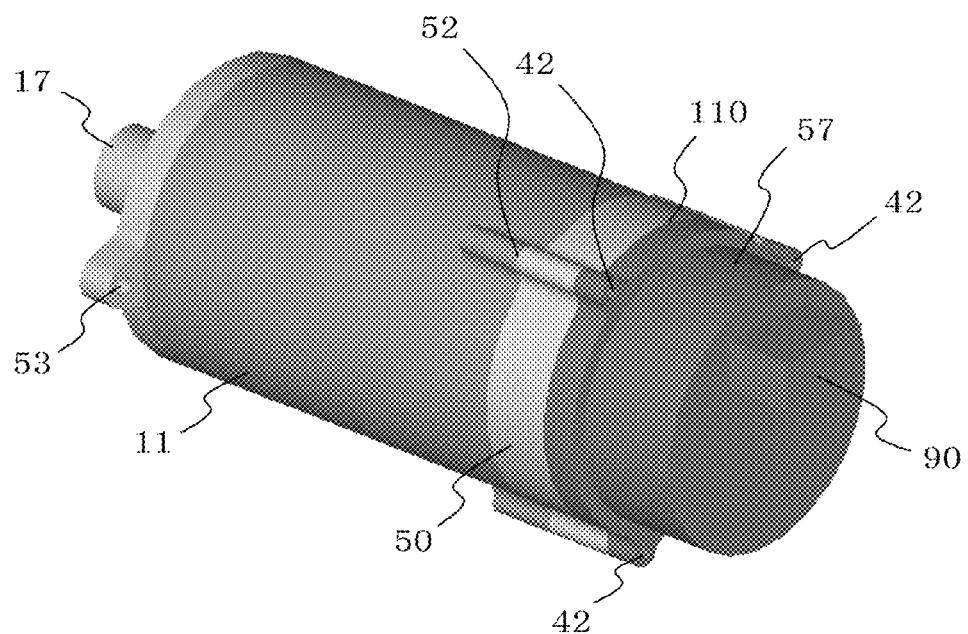
F I G. 1 6
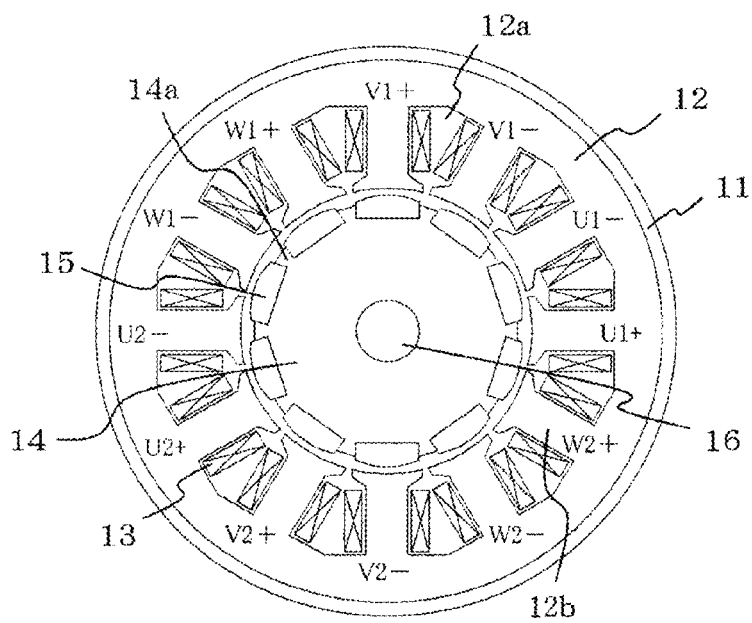

F I G. 2 3
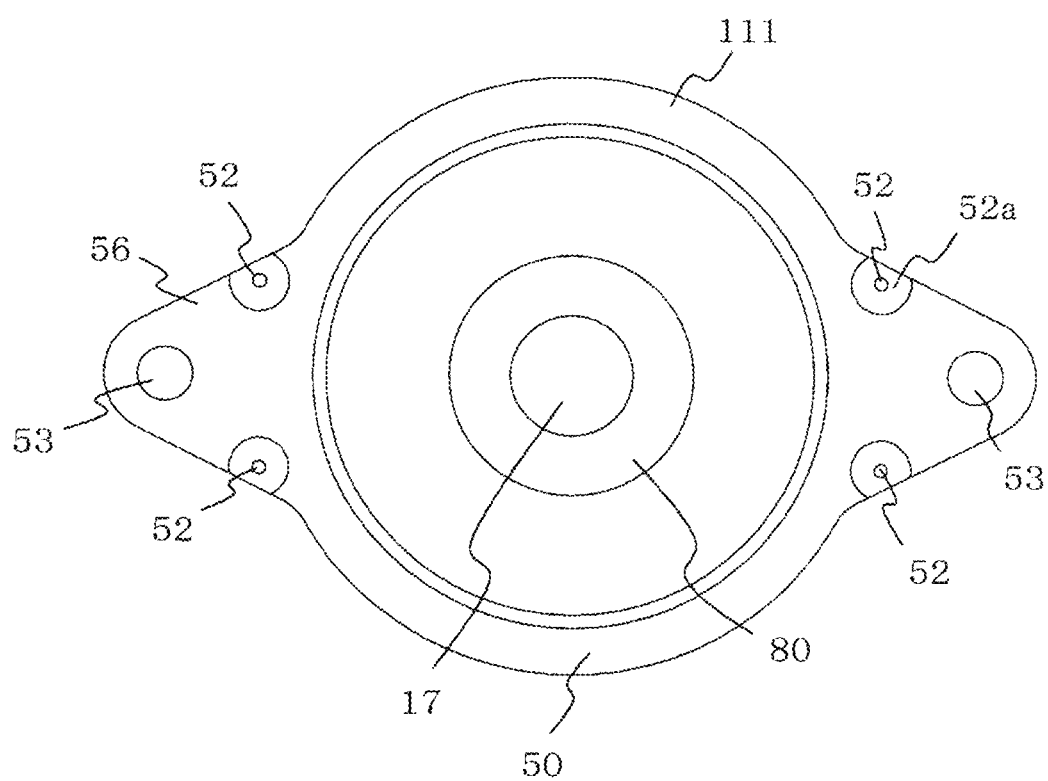

MOTOR DRIVE APPARATUS

CROSS REFERENCE TO RELATED APPLICATIONS

This application is a National Stage of International Application No. PCT/JP2011/055053filed Mar. 4, 2011, the contents of which are incorporated herein by reference in their entirety.

TECHNICAL FIELD

The present invention relates to a motor drive apparatus for driving a motor, for example, used for an electric power steering apparatus for a vehicle.

BACKGROUND ART

Conventionally, a motor drive apparatus in which a motor for an electric power steering apparatus is integrated with a motor drive control apparatus has been devised (see Patent Documents 1 and 2).

For example, a motor drive apparatus described in Patent Document 1 includes: a motor 4; a deceleration mechanism 35; a power board 41 having a heat generating component thereon; a control board 60 having a non-heat generating component thereon; a circuit case 50 in which a torque sensor connector 52, a vehicle speed sensor connector 53 and a power supply connector 51 are integrally molded and a conductive plate for wiring is insert-molded; and a heat sink 70 for dissipating heat from the power board 41 and the like, wherein the power board 41 in tight contact with the heat sink 70, the circuit case 50 attached to the heat sink, covering the power board 41, and the control board 60 attached to the circuit case are stacked in this order to form a controller 40, wherein the motor 4 is attached to the heat sink 70 by a support member 21a of a housing 21, and wherein the heat sink 70 is attached to the deceleration mechanism 35.

Integrating the motor with the motor drive control apparatus in this way can make the apparatus smaller.

PRIOR ART DOCUMENT

Citation List

Patent Document 1: JP-A-2002-120739
Patent Document 2: JP-A-2009-23418

SUMMARY OF INVENTION

Solution to Problem

However, the structure described in Patent Document 1 has a shape such that the support member of the housing protrudes in the direction parallel with the rotation axis of the motor. Such a shape of the housing raises a problem that machining is difficult and material cost is large. Furthermore, two or more separate components are placed in the axis direction, but the components when assembled have poor rigidity, which raises a problem of increasing vibration and noise.

On the other hand, in the structure described in Patent Document 2, the position and number of screws for fixing a motor frame to a housing is not appropriate, which raises a problem of electromagnetic exciting force of a motor increasing vibration.

In order to solve the above-described problems, it is an object of the present invention to provide a motor drive apparatus that achieves both compact size and low vibration/noise at the same time and is suitable for an electric power steering apparatus and the like.

Means for Solving the Problems

The invention provides a motor drive apparatus integrally including: a motor contained in a frame; and a motor drive control apparatus, placed in the direction of the rotation axis of the motor, for performing drive control of the motor, wherein the motor drive control apparatus includes: a heat sink, on which a switching element for performing drive control of the motor is mounted, placed on the front side or rear side of the motor; and a housing coupled to the heat sink, and wherein an abutment surface between the housing and the heat sink is located on a single plane intersecting with the direction of the rotation axis of the motor, and screw holes for coupling the frame, the heat sink and the housing to each other are provided such that the positions in the circumferential direction of the screw holes correspond to each other.

Advantageous Effects of Invention

According to the motor drive apparatus of the invention, the positions in the circumferential direction of the screw holes for coupling the frame, the heat sink and the housing to each other correspond to each other, which provides an effect that, when built into a vehicle or assembled, mechanical interference between the motor/motor drive control apparatus and surrounding components can be avoided. This also provides an effect of improving rigidity and reducing vibration and noise.

Furthermore, an abutment surface between the housing and the heat sink is located on a single plane intersecting with the direction of the rotation axis of the motor, which provides an effect that the machining is easy, the material cost can be decreased, and it is easy to ensure sealability.

BRIEF DESCRIPTION OF DRAWINGS

FIG. 7 is a plan view of a heat sink of the motor drive control apparatus in accordance with the first embodiment of the invention.

FIG. 8 is a plan view of a housing of the motor drive control apparatus in accordance with the first embodiment of the invention.

FIG. 15 is an appearance perspective view of the motor drive apparatus in accordance with the second embodiment of the invention.

FIG. 16 is a longitudinal sectional view of a motor in accordance with a third embodiment of the invention.

FIG. 23 is a plan view of a heat sink of a motor drive control apparatus in accordance with a seventh embodiment of the invention.

DESCRIPTION OF EMBODIMENTS

First Embodiment

Figure 1:
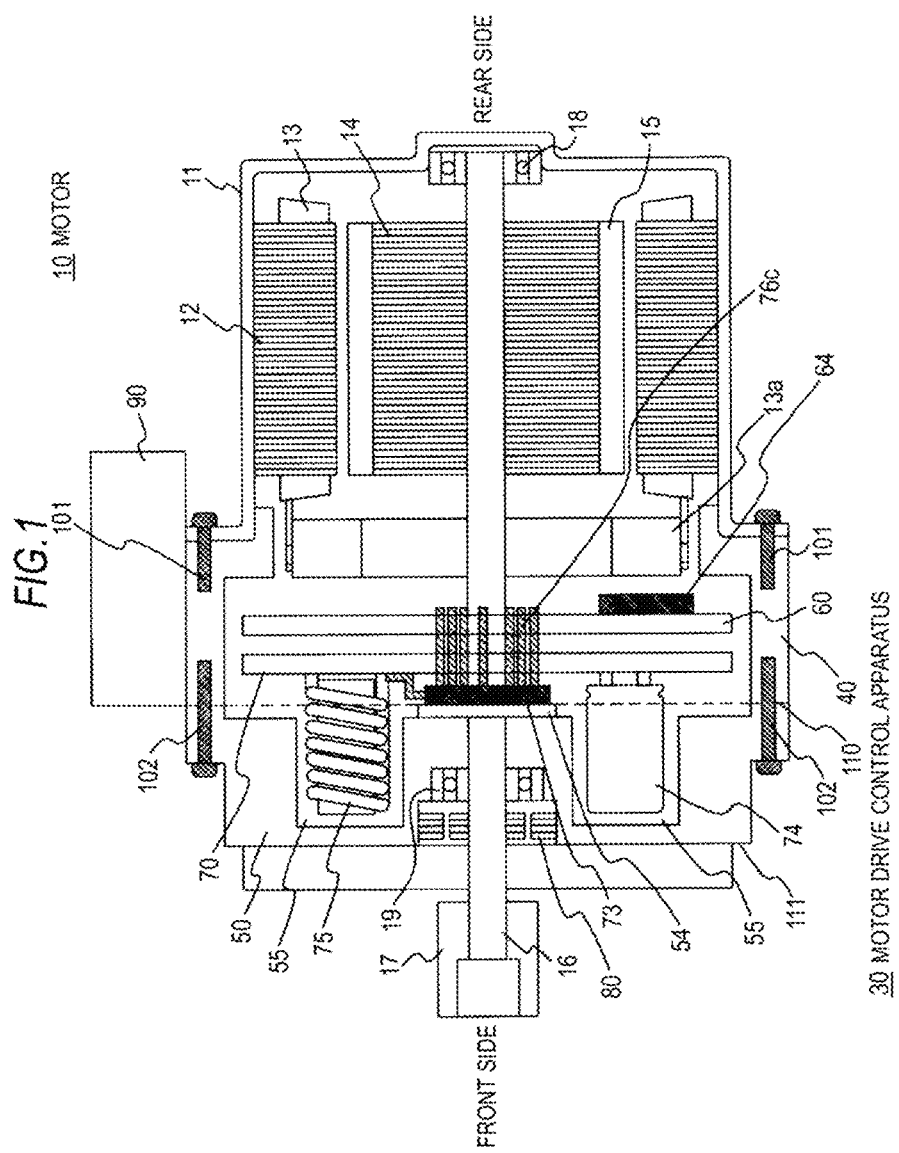
FIG. 1 is a schematic sectional view of a motor drive apparatus in accordance with a first embodiment of the invention.

FIG. 1 is a schematic sectional view of a motor drive apparatus in accordance with a first embodiment of the invention, including: a motor 10; and a motor drive control apparatus 30 placed on the front side of the motor 10 (the output axis side of the motor) and integrated with the motor 10.

In the motor drive control apparatus 30, a connector 90 receives electric power and predetermined information, such as steering torque and vehicle speed information, as electric signal and transfers them to an electric connection 70 and a control board 60. A smoothing capacitor 74 and a coil 75 are buried in a concave hole 55 provided in a heat sink 50. The heat sink 50 is coupled to a housing 40 by a screw 102, and the housing 40 is coupled to a frame 11 of the motor 10 by a screw 101. Note that the housing 40 and the heat sink 50 are formed of a metal, for which aluminum die cast is suitable, for example.

The structure of the motor 10 is described below. An armature winding 13 is wound around a stator core 12. A rotor including a rotor core 14 and a permanent magnet 15 is placed opposite to the stator core 12. A shaft 16 is press-fitted into the rotation axis center of the rotor core 14. A boss 17 is press-fitted into one end of the shaft 16, coupling to the gear shaft of an electric power steering apparatus. The shaft 16 is supported by two bearings 18 and 19, allowing the rotor to be rotatable. One of the bearings 18 and 19 is fixed to the heat sink 50 of the motor drive control apparatus 30, and the other is fixed to the frame 11. On the front side of the heat sink 50, a variable reluctance type resolver 80 is provided as a sensor for detecting the rotation angle of the motor 10. The stator core 12 is fixed to the frame 11 by press fitting or shrinkage fitting, and the frame 11 is fixed to the housing 40. The armature winding 13 is electrically connected to a bus bar (not shown) via a terminal 13a and is electrically connected to the motor drive control apparatus 30 via the bus bar. The bus bar can be supplied with current by a switching element 73 of the motor drive control apparatus 30 to drive the motor 10.

Figure 2:
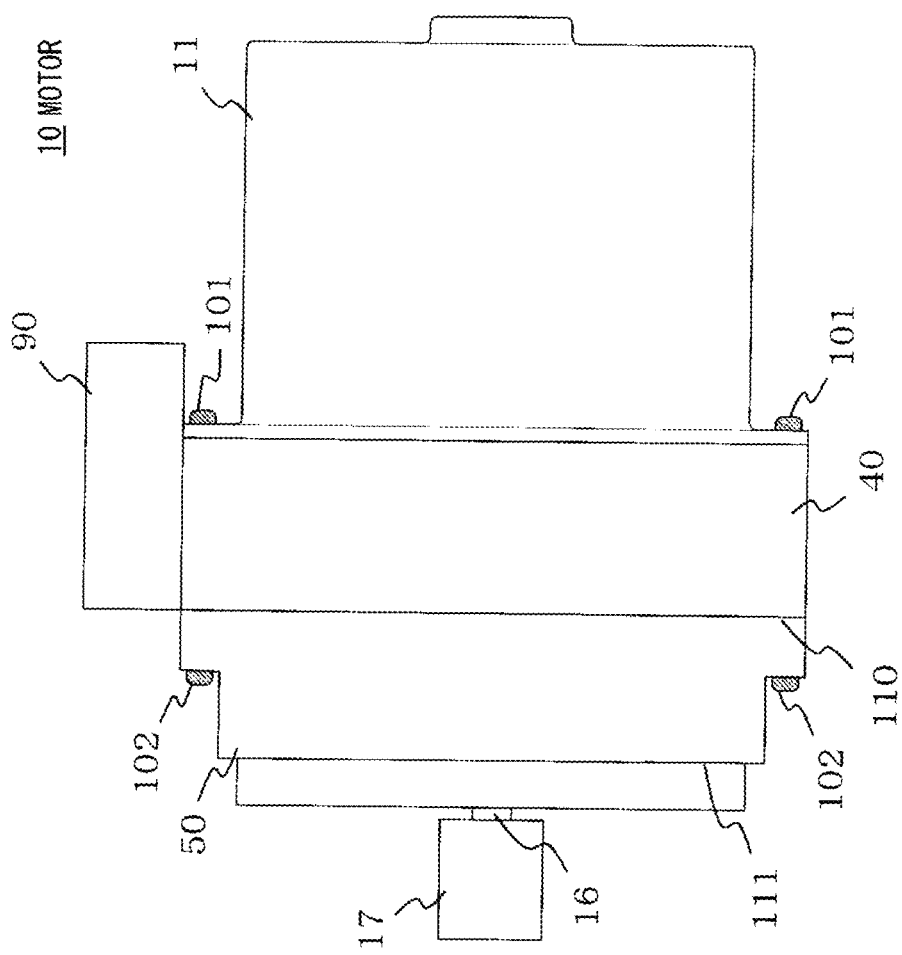
FIG. 2 is a side view of the motor drive apparatus in accordance with the first embodiment of the invention.

FIG. 2 is a side view of the motor drive apparatus according to the first embodiment, showing an appearance of the motor drive control apparatus 30 placed on the front side of the motor 10 and integrated with the motor 10, and the motor 10. The frame 11 of the motor 10 is fixed to the housing 40 of the motor drive control apparatus 30 by the screw 101. Furthermore, the heat sink 50 is also fixed to the housing 40 by the screw 102.

Figure 3:
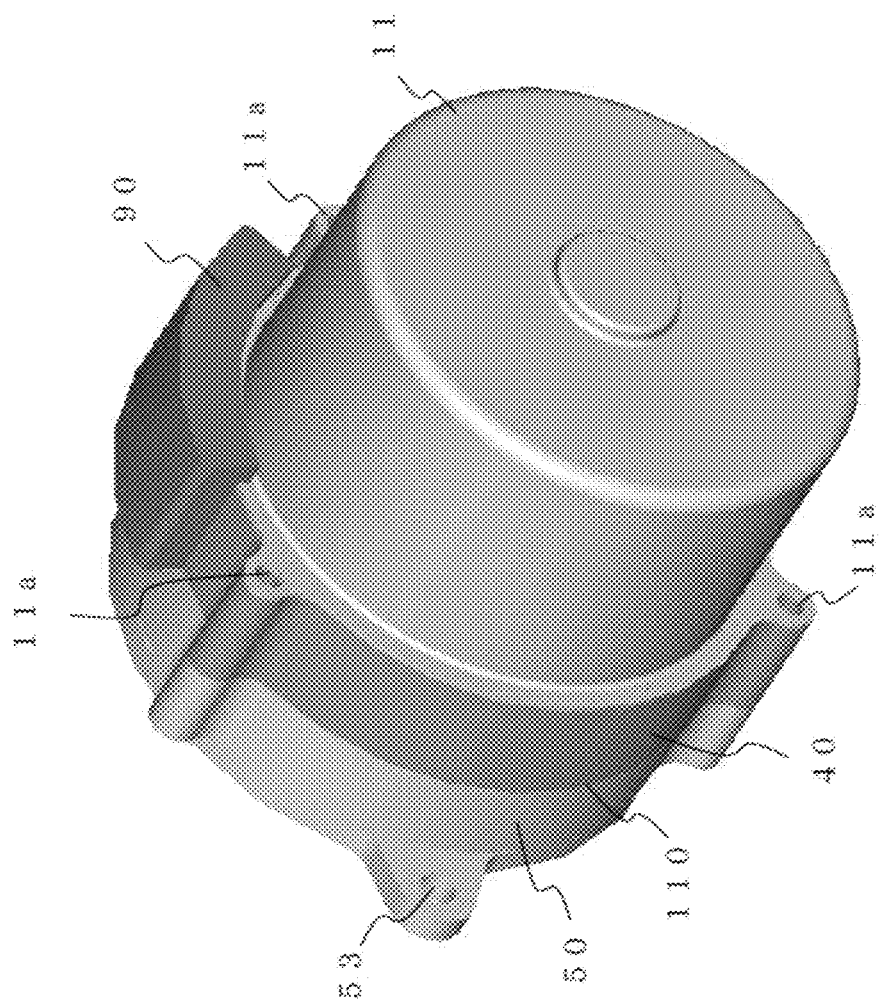
FIG. 3 is an appearance perspective view of the motor drive apparatus in accordance with the first embodiment of the invention.

FIG. 3 is an appearance perspective view of the motor drive apparatus according to the first embodiment, showing the perspective view of the motor 10 and the motor drive control apparatus 30 placed on the front side of the motor 10 and integrated with the motor 10. Note that, for the sake of simplicity, FIG. 3 does not show the detailed structure of the connector 90 part and the like and does not show the screws that fix the frame 11 and the heat sink 50 to the housing 40. The connector 90 part includes a power supply connector and a control signal connector (not shown in detail).

The cup-shaped frame 11 to which the stator core 12 of the motor 10 is fixed by press fit has a shape that is spread in the outer diameter direction around the contact surface with the housing 40, in which three screw holes 11a are provided in the circumference direction. So, the frame 11 is fixed to the housing 40 by three screws (not shown). Furthermore, an abutment surface 110 between the housing 40 and the heat sink 50 is located on a single plane intersecting with the direction of the rotation axis of the motor 10. The position of the screw holes provided to accept the screws for fixing the frame 11 of the motor 10 to the housing 40 correspond in the circumference direction to those provided to accept the screws for fixing the heat sink 50 to the housing 40. Furthermore, the heat sink 50 is provided with a screw hole 53 for fixing the heat sink 50 to the gear side. FIG. 3 shows only one screw hole 53, but another screw hole 53 is provided opposite the one screw hole 53 at an angle of 180 degree or approximately 180 degree from the one screw hole 53.

The detailed structure of the housing 40 and the heat sink 50 is described later.

Figure 4:
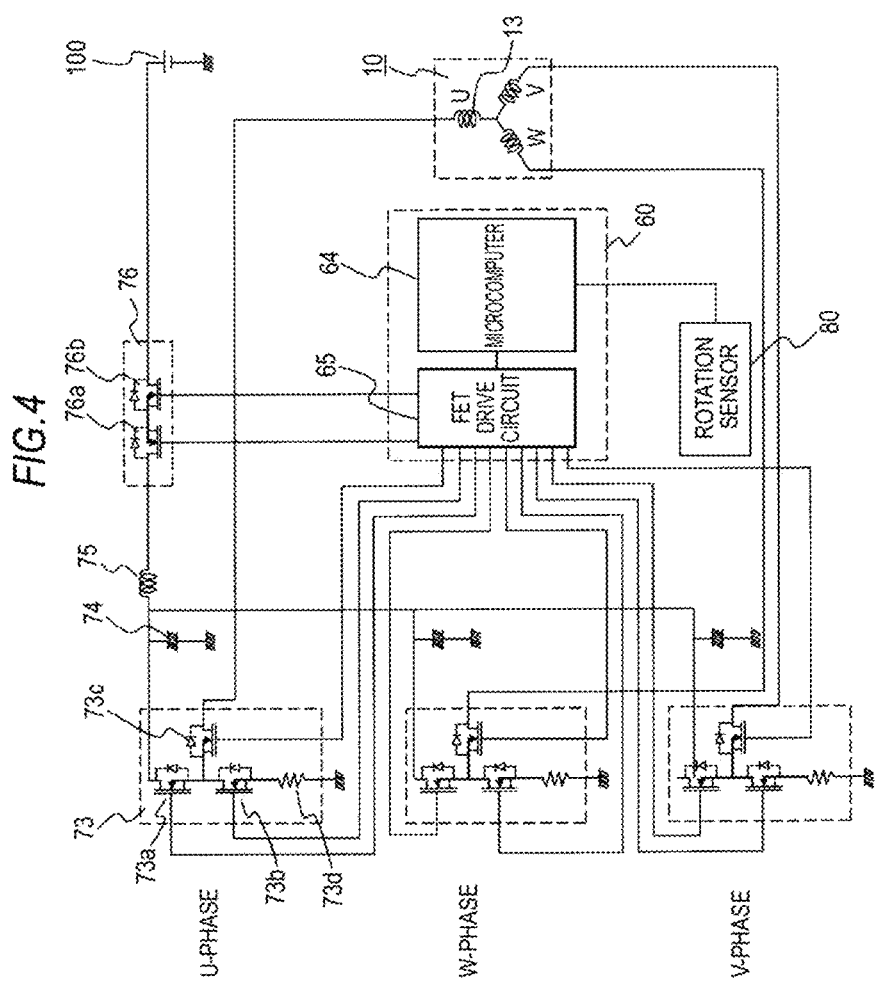
FIG. 4 is a circuit diagram of the motor drive apparatus in accordance with the first embodiment of the invention.

FIG. 4 is a circuit diagram of the motor drive control apparatus 30. Now, with reference to FIG. 4, the electrical connection of the sections shown in FIG. 1 is described. The armature winding 13 of the motor 10 is connected in Y-connection. FETs 73a, 73b are mounted in the switching element 73, one ends of the FETs 73a, 73b being connected to each other, one of the FETs, the FET 73a, configuring a (+)-side arm of the U-phase of a three-phase bridge circuit, the other of the FETs, the FET 73b, configuring a (−)-side arm of the U-phase. On the other hand, the other end of the FET 73*a* is connected to the smoothing capacitor 74 for removing ripple and the coil 75 for removing noise. The other end of the FET 73*b* is connected to the ground potential of the vehicle via a shunt resistor 73*d*. The connection point at which the one ends of the FET 73*a*, 73*b* are connected to each other serves as a U-phase AC-side terminal of the three-phase bridge circuit. Furthermore, another FET 73*c* is mounted in the switching element 73, one end of the FET 73*c* being connected to the U-phase AC-side terminal, the other end being connected to the U-phase terminal of the armature winding 13.

The W-phase and the V-phase are configured similarly.

Two FETs 76*a*, 76*b* are mounted in a power supply relay 76, one ends of the FETs 76*a*, 76*b* being connected to each other, the other end of the FET 76*a* being connected to a (+)-side DC terminal of the three-phase bridge circuit via the coil 75, the other end of the FET 76*b* being connected to a battery 100 on board of the vehicle via the power supply connector. In the example shown in FIG. 4, the power supply relay 76 is placed between the battery 100 and the coil 75, but the power supply relay 76 may also be placed between the coil 75 and the smoothing capacitor 74.

An FET drive circuit 65 is mounted on the control board 60 with output ends connected to the gates of the above-described FETs, and is configured to provide gate drive signals to the gates at their predetermined times. A microcomputer 64 is mounted on the control board 60 and controls when the FET drive circuit 65 is to output a gate drive signal, based on a rotation detection signal from the resolver 80 as the above-described rotation sensor.

With the thus configured motor drive apparatus according to the first embodiment of the invention used for the electric power steering apparatus, when a driver operates a steering wheel to provide a steering torque to a steering shaft, a torque detector not shown detects the steering torque and inputs the detection result to the microcomputer 64. Furthermore, a rotation detection signal corresponding to the number of revolution of the steering wheel detected by the resolver 80 as the rotation sensor is input to the microcomputer 64. The microcomputer 64 calculates assist torque based on the steering torque, the number of revolution of the steering wheel, the vehicle speed signal and the like input thereto, and controls the three-phase bridge circuit as the motor drive circuit so that the motor 10 generates a torque for providing the assist torque to the steering shaft via the deceleration mechanism.

Specifically, based on instruction from the microcomputer 64, the FET drive circuit 65 generates gate drive signal at a predetermined time to control the conduction of the FETs of the three-phase bridge circuit. This causes the three-phase bridge circuit to generate a predetermined three-phase AC current and supply the three-phase AC current to the armature winding 13 of the motor 10 to drive the motor 10. The torque generated by the motor 10 is provided as assist torque to the steering shaft via the deceleration mechanism. This allows the force applied to the steering wheel by the driver to be reduced. In this example, the armature winding 13 of the motor 10 is connected in Y-connection, but may also be connected in Δ-connection, of course.

Next, the structure of the motor drive control apparatus 30 is described in detail.

Figure 5:
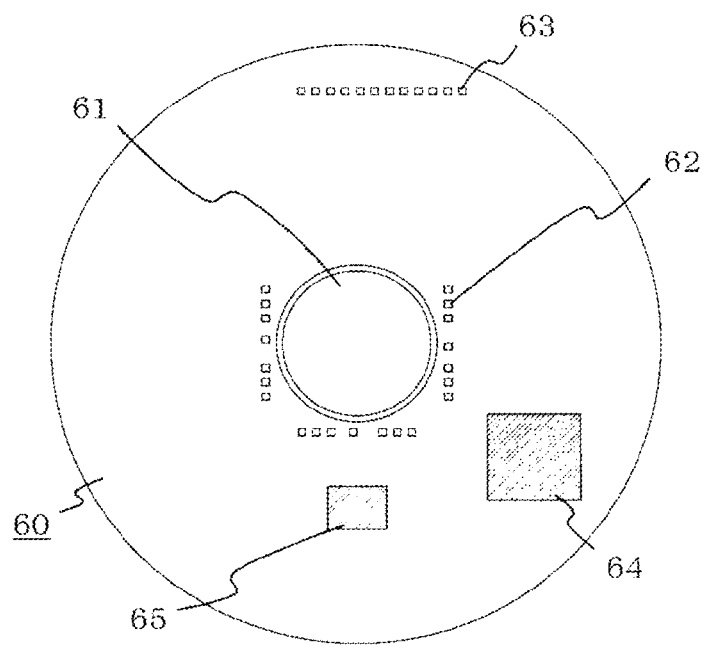
FIG. 5 is a plan view of a control board of the motor drive control apparatus in accordance with the first embodiment of the invention.
Figure 6:
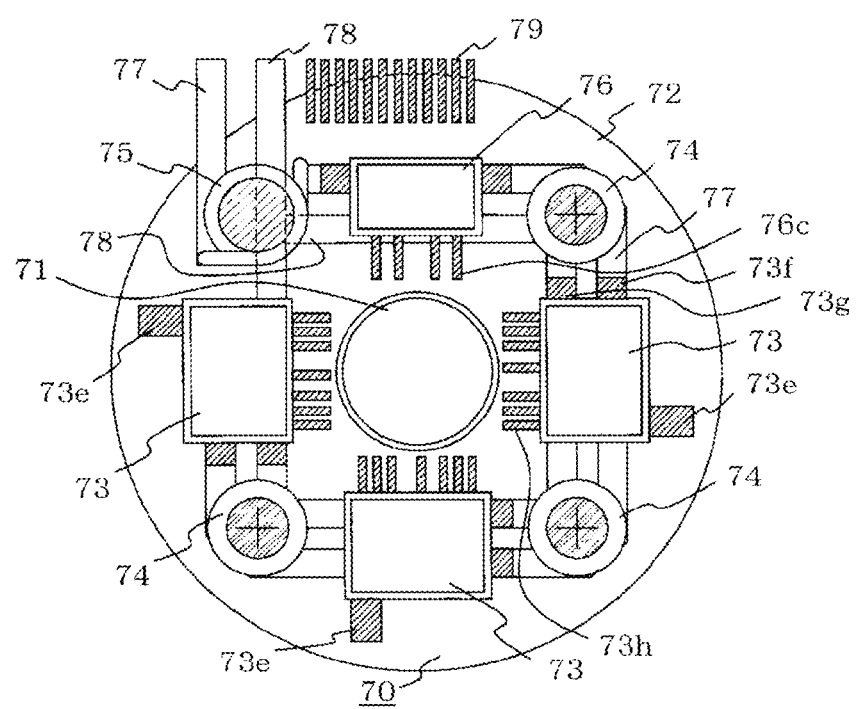
FIG. 6 is a plan view of an electric connection of the motor drive control apparatus in accordance with the first embodiment of the invention.

The motor drive control apparatus 30 is structured by stacking the control board 60 in FIG. 5, the electric connection 70, the smoothing capacitor 74, the coil 75 and the switching element 73 in FIG. 6, the heat sink 50 in FIG. 7, and the housing 40 in FIG. 8 in the direction of the rotation axis of the motor 10.

FIG. 5 is a plan view of the control board 60 of the motor drive control apparatus according to the first embodiment, viewed from the rear side of the control board 60 (the side opposite to the output shaft of the motor). FIG. 5 shows only the outline of the circuit structure and does not show the detail. The control board 60 has the microcomputer 64 and the FET drive circuit 65 mounted thereon, has in the center a hole 61 through which the shaft 16 of the motor 10 passes, and has around the hole 61 a predetermined number of holes 62 through which control signal lines pass. In the upper portion in this figure of the control board 60, a predetermined number of holes 63 are provided through which terminals as signal lines from the connector 90 pass.

The control board 60 is fixed to the electric connection 70 by a screw or soldering to a control signal line 73*h*.

FIG. 6 is a plan view of the electric connection of the motor drive control apparatus according to the first embodiment, in which the electric connection 70, the smoothing capacitor 74, the coil 75 and the switching element 73 are viewed from the front side. The electric connection 70 includes a (+)-side bus bar 77, a (−)-side bus bar 78 and a frame 72 formed of an insulating member such as resin. The frame 72 plays a role of holding the terminal 79 that is the signal line from the bus bars 77 and 78 and the connector 90 and a role of ensuring electric insulation between these members and the other members. The bus bar 77 is connected to the battery 100, in which the (+) side of the battery 100 is electrically connected to the (+)-side bus bar 77 via a harness and a connector electrode. This bus bar 77 is connected to one terminal of the coil 75. The other terminal of the coil 75 is connected to another (+)-side bus bar. Furthermore, the bus bar 77 is placed in a square around a shaft insertion hole 71. On the other hand, the (−)-side bus bar 78 is placed in a square inside the (+)-side bus bar 77 and connected to the (−)-side of the battery 100 via a harness and a connector electrode.

Note that the electric connection 70 is fixed to the heat sink 50 with a screw or the like.

Furthermore, the smoothing capacitor 74 and the switching element 73 are connected to the (+)-side bus bar 77 and the (−)-side bus bar 78. Furthermore, the power supply relay 76 is connected in series to the (+) side of the coil 75. The ON/OFF of the power supply relay 76 is controlled by a control signal line 76*c* extending from the power supply relay 76. In FIG. 6, three smoothing capacitors 74 are placed at the corners of the bus bars 77 and 78 placed in a square and connected to the bus bars 77 and 78. The switching element 73 is connected to the (+)-side bus bar 77 via a (+)-side terminal 73*f* and connected to the (−)-side bus bar 78 via a (−)-side terminal 73*g*. Furthermore, a motor-side terminal 73*e* is provided to each switching element 73 to supply current to the motor 10. The control signal line 73*h* extends from the switching element 73 to the control board 60.

The switching element 73 may be structured in a module in which a MOSFET bare chip and a shunt resistor are molded in resin. Molding the bare chip in resin allows heat generated by the switching element 73 to be efficiently propagated to a switching element placement section of the heat sink 50, suppressing temperature increase of the switching element 73. Accordingly, the increase in temperature of the control board 60 and a controller device can also be suppressed. Needless to say, the switching element 73 is not limited to the above, but may be structured such that a bare chip is mounted on a ceramic substrate, such as a direct-bonded copper (DBC) substrate.

FIG. 7 is a plan view of the heat sink of the motor drive control apparatus according to the first embodiment, in which the heat sink 50 is viewed from the rear side. The heat sink 50 in FIG. 7 has a generally circular outer shape viewed from the rear side and has on the periphery the two screw holes 53 for coupling to the gear side, the screw holes 53 being provided opposite to each other at an angle of 180 degree or approximately 180 degree between them. Screws holes 52 are provided at three locations away from the screw hole 53 in the axis direction. The screw holes 52 are for coupling to the housing 40 described later, and are provided at three locations approximately 120 degree away from each other in FIG. 7. A hole 51 through which the shaft 16 of the motor 10 passes is provided at the center of the heat sink 50. Rectangular-shaped switching element placement sections 54 are provided at three locations around the hole 51. The switching element placement section 54 corresponds to that shown in FIG. 1 and it is desirable that the surface of the switching element placement section 54 is precisely machined to be flat in order to maintain uniform contact with the switching element 73. Furthermore, a circular hole 55 is provided adjacent to the switching element placement section 54. The hole 55 is a concave hole for burying the smoothing capacitor 74 and the coil 75 in FIG. 1. In the example shown in FIG. 7, four holes are provided in order to bury three smoothing capacitors 74 and one coil 75.

FIG. 8 is a plan view of the housing 40 of the motor drive control apparatus according to the first embodiment, in which the housing 40 is viewed from the rear side. Screw holes 42 for coupling to the frame 10 are provided at three locations in the circumferential direction, the location corresponding to the locations in the circumferential direction of the screw holes 52 of the heat sink in FIG. 7. The frame 11 of the motor 10 is fixed to the housing 40 by inserting the screws 101 into the screw holes 42. A hole 41 through which the shaft 16 of the motor 10 passes is provided at almost the center of the housing 40. Furthermore, holes 43 are provided at three locations through which a bus bar (not shown) for electrically connect the motor 10 to the switching element 73 passes. The reason of the three holes is that the motor 10 is intended to electrically connect to the switching element 73 via individual bus bars of the U-phase, V-phase and W-phase of the motor 10.

The first embodiment of the invention configured as described above provides the effects as follows.

The motor drive control apparatus 30 in FIG. 1 includes the housing 40 and the heat sink 50, in which the housing 40 and the heat sink 50 are placed in the direction of the rotation axis of the motor 10 in the form of two separate components. When two or more separate components are placed in the direction of the rotation axis of the motor 10 like the above, a conventional structure raises a problem of decreasing rigidity and increasing vibration and noise due to inappropriate fixing method of those parts. However, in the invention, the positions of the screw holes 42 provided to accept the screws 101 for fixing the frame 11 to the housing 40 including the two or more separate components correspond to the positions of the screw holes 52 provided to accept the screws 102 for fixing the heat sink 50 to the housing 40 in the circumferential direction. The correspondence of the positions of the screw holes 52 in the circumferential direction provides an effect that, when built into a vehicle or assembled, mechanical interference between the motor 10/motor drive control apparatus 30 and surrounding components can be avoided. This also provides an effect of improving rigidity and reducing vibration and noise. Furthermore, it provides an effect of improving the freedom of positioning the screw holes 53 for fixing the motor drive control apparatus 30 to the gear.

Furthermore, in FIG. 8 of the Patent Document 1, the support member is provided protruding into the housing. Such a structure raises a problem that the machining of the housing is difficult, the material cost increases, and it is difficult to ensure sealability when water proof capability is required. However, the structure in which the abutment surface 110 between the housing 40 and the heat sink 50 is located on a single plane intersecting with the direction of the rotation axis of the motor 10 provides an effect that the machining is easy, the material cost can be decreased, and it is easy to ensure sealability.

Furthermore, the first embodiment has a structure in which the motor drive control apparatus 30 is placed on the front side of the motor 10, or the side near the gear of the electric power steering apparatus. Such a structure can achieve compact size in comparison with a structure in which the motor drive control apparatus 30 is provided separate from the motor 10. However, although the conventional example raises the problem of decreasing rigidity and increasing vibration and noise due to inappropriate fixing method of the components of the heat sink 50 and the housing 40, the structure according to the invention can solve the problem. So, the invention provides an effect of achieving low vibration/noise and compact size at the same time.

Furthermore, in the Patent Document 1, the case covering the circuit components is a circuit case made of an insulating resin that is insert molded. The housing 40 and the heat sink 50 according to the first embodiment are made of aluminum die cast, which provides an effect of high rigidity and low vibration/noise in comparison with being made of resin.

Furthermore, as shown in FIG. 1, the motor 10 includes one or more bearings 18, 19, at least one of the bearings 18, 19 being placed on the output shaft side of the motor 10 with respect to the abutment surface 110 between the housing 40 and the heat sink 50 that are placed in the form of at least two or more separate components. This structure makes short the distance between a bearing (not shown) on the gear side and the bearing 19 on the front side of the motor 10, which provides an effect of improving mechanical rigidity and reducing runout of the shaft 16, thereby reducing vibration and noise.

In the first embodiment, the example is shown in which the housing 40 and the heat sink 50 are configured in the form of two separate components. However, the invention is not limited to this. Needless to say, even when the housing 40 and the heat sink 50 are configured in the form of three or four or more separate components arranged, as far as the positions of screw holes of the fixing section correspond in the circumferential direction between the components, a similar effect can be provided. However, when the housing 40 and the heat sink 50 in the form of two separate components are placed in the direction of the rotation axis of the motor 10, the number of components is small, providing an effect of reducing cost. Also, the number of components to be assembled in the direction of the rotation axis of the motor 10 is small, providing an effect of improving accuracy of assembling.

Furthermore, in the first embodiment, when the heat sink 50 is fixed to the housing 40, the fixing is performed by using the two screws 101 and 102 on both sides of the housing 40 in the direction parallel to the motor rotation axis in the fixing section. According to this structure, in assembling the components, it is possible to, first, fix the heat sink 50 to the housing 40, then fix the frame 11 of the motor 10 to the housing 40, which eliminates the need for assembling the heat sink 50, the housing 40 and the frame 11 of the motor 10 at one time, providing an effect of improving assemblability and freedom of manufacturing process.

Figure 9:
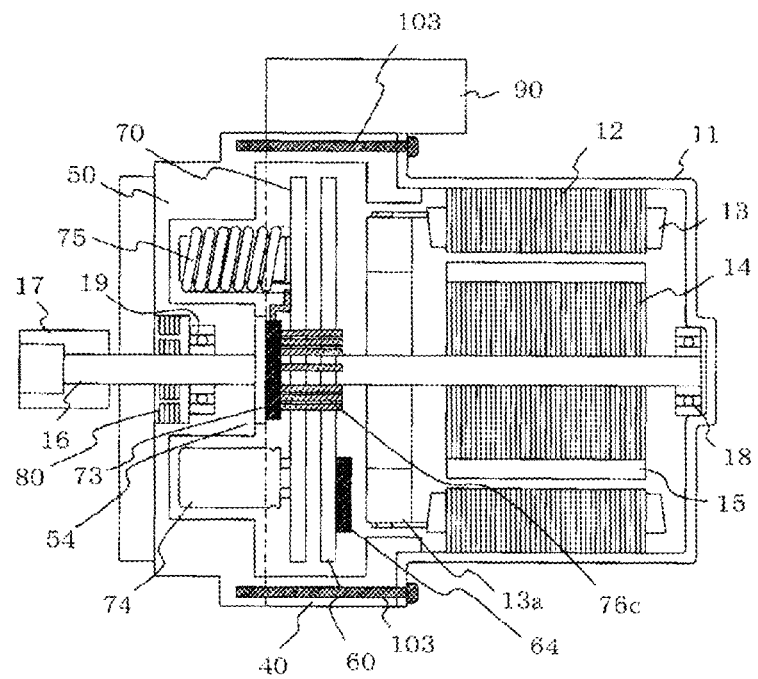
FIG. 9 is a schematic sectional view of another example of the motor drive apparatus in accordance with the first embodiment of the invention.

In the first embodiment, the two screws 101 and 102 are used to fix the heat sink 50 to the housing 40. However, as shown in FIG. 9, one common screw 103 can be used at each fixing section, providing an effect of further decreasing the number of components.

In the first embodiment, the bearing surface of the screw 102 for fixing the heat sink 50 to the housing 40 is positioned nearer the rear side of the motor 10 with respect to the abutment surface 111 between the gear and the heat sink 50. When the motor drive control apparatus 30 and the motor 10 are assembled to the gear, this structure provides an effect of avoiding mechanical interference with components around the gear.

In FIG. 6, the switching element 73, the smoothing capacitor 74 and the coil 75 are placed to surround the hole 71 through which the shaft 16 of the motor 10 passes (the center of the rotation axis of the motor 10). Furthermore, as shown in FIG. 7, in the heat sink 50, the switching element placement sections 54 are similarly placed to surround the hole 51 through which the shaft 16 of the motor 10 passes (i.e., the center of the rotation axis of the motor 10), and also, the holes 55 for containing the smoothing capacitor 74 and the coil 75 are provided. This structure achieves compact size of the apparatus and allows heat generating components to be distributed on the heat sink 50 instead of concentrating in a certain area of the heat sink 50, which provides an effect of suppressing temperature increase and efficiently dissipating heat from the heat sink 50 to the gear side.

Second Embodiment

Figure 10:
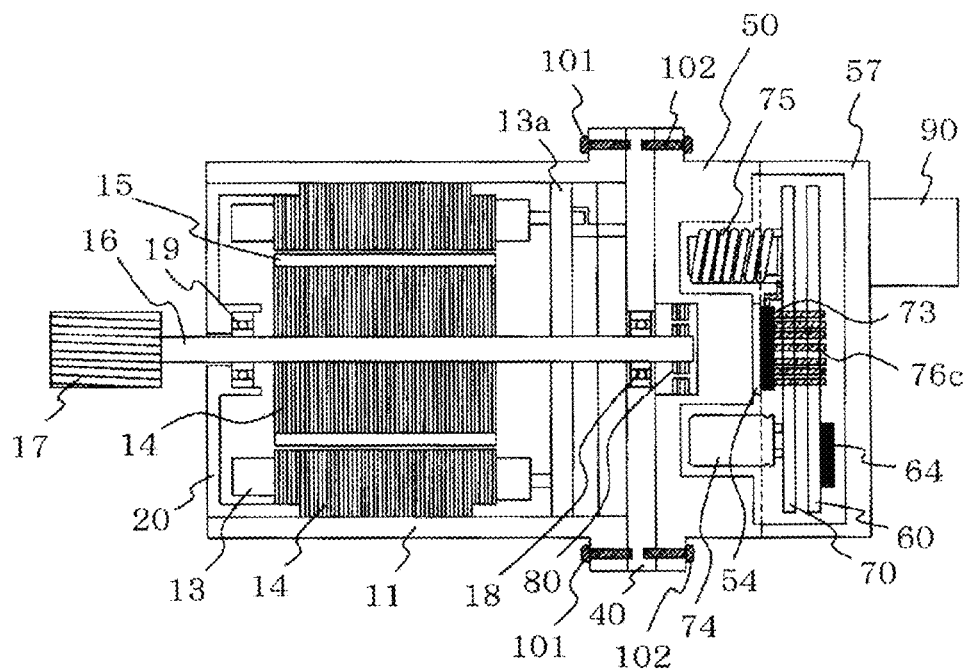
FIG. 10 is a schematic sectional view of a motor drive apparatus in accordance with a second embodiment of the invention.

FIG. 10 is a schematic sectional view of a motor drive apparatus in accordance with a second embodiment of the invention, in which the motor drive control apparatus 30 is placed on the side opposite to the gear side of the electric power steering apparatus (the deceleration mechanism side), i.e., placed on the rear side of a motor 10, and integrated with the motor 10.

The motor drive control apparatus 30 includes: the control board 60 having the microcomputer 64 mounted thereon; the electric connection 70 for electrically connecting the coil 75 and the smoothing capacitor 74, on the motor 10 side with respect to the control board 60; the switching element 73 placed on the switching element placement sections 54; and the heat sink 50 that is integrated with (or may be separate from) the switching element placement sections 54. The heat sink 50 includes holes in which the smoothing capacitor 74 and the coil 75 are buried. The motor drive control apparatus 30 is covered with a cover 57 made of metal or resin. The connector 90 is provided behind the cover 57 to supply power from the battery 100 and provide torque sensor signal and vehicle speed signal. Note that the cover 57 is fixed to the heat sink 50 with an adhesive or a screw or a combination thereof.

On the other hand, the motor 10 includes: the stator core 12; the armature winding 13 wound around the stator core 12; and a cover 20 provided at the end of the rear side and the front side in the direction of the rotation axis of the stator core 12. The cover 20 and the stator core 12 are fixed to the frame 11 by shrinkage fitting or the like. The frame 11 is made of, e.g., aluminum and fixed by the screw 101 to the housing 40 to which the bearing 18 on the rear side is to be fixed. The frame 11, the housing 40 and the heat sink 50 are fixed by the screw 101 from the front side and the screw 102 from the rear side. Furthermore, although not shown, as described in the first embodiment, the position of the screw holes in the circumferential direction for the frame 11 and the housing 40 corresponds to that for the housing 40 and heat sink 50.

A rotor including the rotor core 14 and the permanent magnet 15 is provided opposite to the stator core 12 of the motor 10. The shaft 16 is press-fitted into the rotation axis center of the rotor core 14. The bearing 18 and the bearing 19 are provided to the shaft 16. The bearing 19 on the front side is fixed to the cover 20, and the bearing 18 on the rear side is fixed to the housing 40, allowing the rotor to be rotatable. The boss 17 is provided at one end of the shaft 16 and coupled to the gear of an electric power steering apparatus. In this example, as described later, a structure is assumed in which a belt is placed on the boss 17 and the belt drives a ball screw. Furthermore, the resolver 80 as a rotation angle sensor is provided at the other end of the shaft 16. Note that a combination of the permanent magnet 15 and a magnetic resistance element (GMR sensor or MR sensor) may be used as a rotation angle sensor in place of the resolver.

With the above-described structure, even when the motor drive control apparatus 30 is placed on the side opposite to the gear side of the electric power steering apparatus (the deceleration mechanism side), i.e., placed on the rear side of a motor 10, and integrated with the motor 10, the same effect as described in the first embodiment can be provided, improving the rigidity of the frame 11, the housing 40 and the heat sink 50, thereby providing an effect of achieving both low vibration/noise and compact size at the same time. Furthermore, the screws 101 and 102 are tightened from the both ends, which eliminates the need for assembling the heat sink 50, the housing 40 and the frame 11 of the motor 10 at one time, providing an effect of improving assemblability and freedom of manufacturing process.

Figure 11:
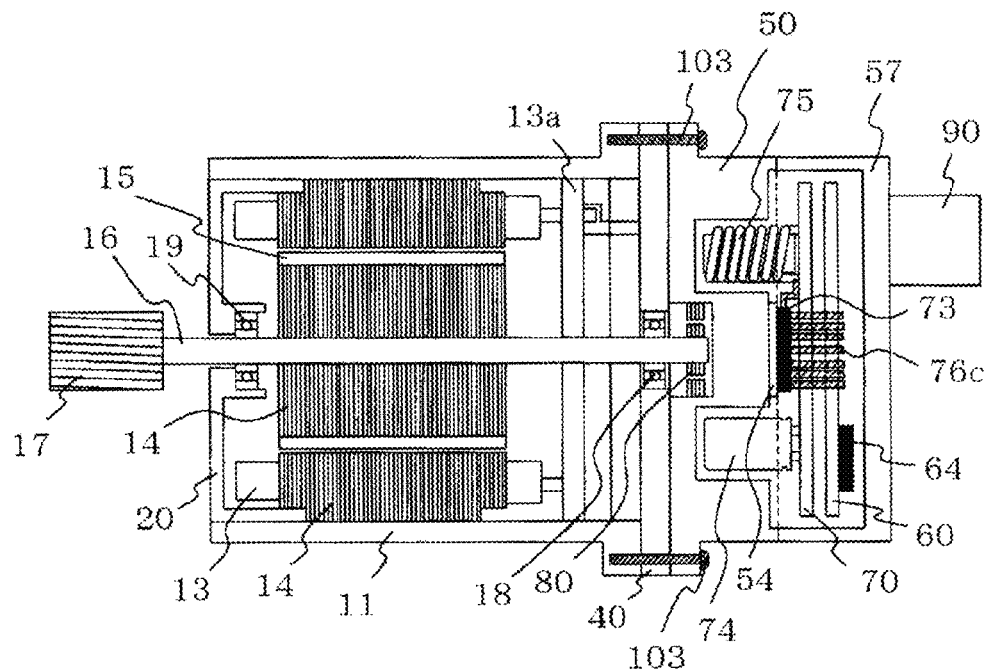
FIG. 11 is a schematic sectional view of another example of the motor drive apparatus in accordance with the second embodiment of the invention.

FIG. 11 is a schematic sectional view of another example of the motor drive apparatus in accordance with the second embodiment, in which the motor drive control apparatus 30 is placed on the side opposite to the gear side of the electric power steering apparatus (the deceleration mechanism side), i.e., placed on the rear side of a motor 10, and integrated with the motor 10. The difference between FIG. 11 and FIG. 10 is in the method for fixing the frame 11, the housing 40 and the heat sink 50. In FIG. 11, one screw 103 is used at each fixing section to fix the frame 11, the housing 40 and the heat sink 50. Furthermore, although not shown, as described in the first embodiment, the positions of the screw holes 103 in the circumferential direction for the frame 11 and the housing 40 correspond to that for the housing 40 and heat sink 50.

The above-described structure improves the rigidity of the frame 11, the housing 40 and the heat sink 50, thereby providing an effect of achieving both low vibration/noise and compact size of the apparatus at the same time. Furthermore, the structure in which one screw is used at each fixing section provides an effect of decreasing the number of components in comparison with using two screws from the both ends of each fixing section.

Figure 12:
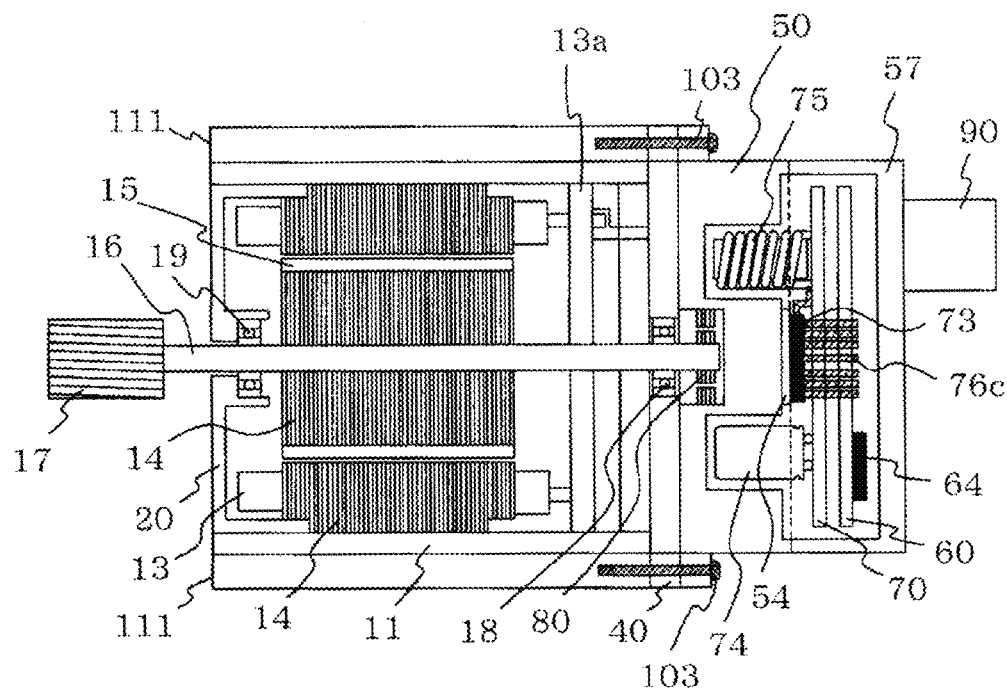
FIG. 12 is a schematic sectional view of another example of the motor drive apparatus in accordance with the second embodiment of the invention.

FIG. 12 is a schematic sectional view of another example of the motor drive apparatus in accordance with the second embodiment, in which the motor drive control apparatus 30 is placed on the side opposite to the gear side of the electric power steering apparatus (the deceleration mechanism side), i.e., placed on the rear side of a motor 10, and integrated with the motor 10 in another way. The frame 11, the housing 40 and the heat sink 50 are fixed by the common screws 103. The protruding part of the frame 11 in which a screw hole is provided is provided across the length in the axis direction of the frame 11. This shape can be made by extrusion processing aluminum. Although not shown, as described in the first embodiment, the positions of the screw holes in the circumferential direction for the frame 11 and the housing 40 correspond to that for the housing 40 and heat sink 50.

The above-described structure improves the rigidity of the frame 11, the housing 40 and the heat sink 50, thereby providing an effect of achieving both low vibration/noise and compact size of the apparatus at the same time. Furthermore, making the frame 11 by extrusion increases the freedom of cross-section shape, thereby providing an effect of allowing easy shaping of the frame 11 having a cross-section shape for which the layout including the gear is considered. Furthermore, in FIG. 12, an abutment surface 111 with the gear side is shown on the front side of the frame 11, the abutment surface 111 being located on the straight line extending from the screw 103 fixing the frame 11, the housing 40 and the heat sink 50 in the direction of the motor rotation axis. In this point, FIG. 12 differs from FIGS. 10 and 11. With this structure, the abutment surface 111 between the motor 10 and the gear is away from the motor rotation axis, which provides an effect of reducing vibration in comparison with the structures in FIGS. 10 and 11 even when exciting force is applied in the direction perpendicular to the motor rotation axis.

Figure 13:
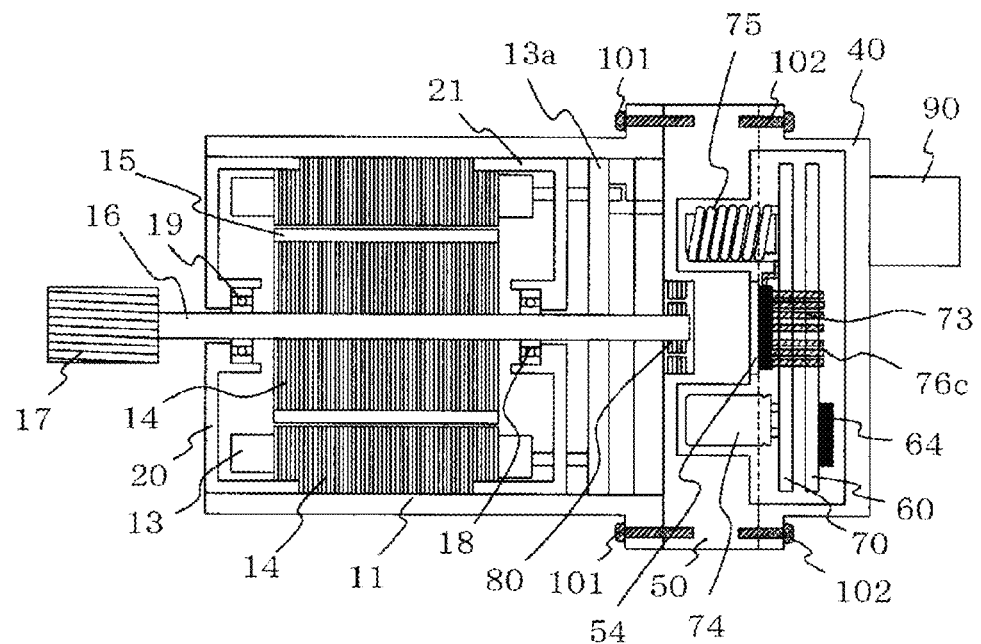
FIG. 13 is a schematic sectional view of another example of the motor drive apparatus in accordance with the second embodiment of the invention.

FIG. 13 is a schematic sectional view of another example of the motor drive apparatus in accordance with the second embodiment, in which the motor drive control apparatus 30 is placed on the side opposite to the gear side of the electric power steering apparatus (the deceleration mechanism side), i.e., placed on the rear side of a motor 10, and integrated with the motor 10 in yet another way. FIG. 13 differs from FIGS. 10, 11 and 12 in that the bearing 18 on the rear side is covered by the cover 21 as with the bearing 19 on the front side. Then, the frame 11 of the motor 10, the heat sink 50 and the housing 40 covering the control board 60 and the like are fixed by the screws, each fixing section being tightened by the two screws 101 and 102 from both ends in the axis direction.

The above-described structure improves the rigidity of the frame 11, the housing 40 and the heat sink 50, thereby providing an effect of achieving both low vibration/noise and compact size of the apparatus at the same time. Furthermore, the screws 101 and 102 are tightened from the both ends, which eliminates the need for assembling the heat sink 50, the housing 40 and the frame 11 of the motor 10 at one time, providing an effect of improving assemblability and freedom of manufacturing process.

Figure 14:
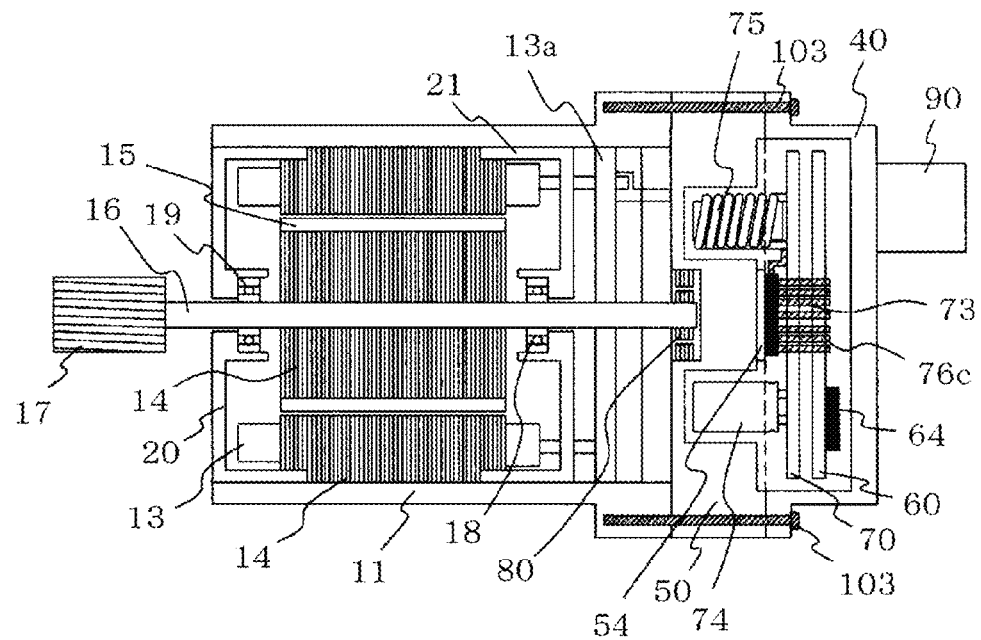
FIG. 14 is a schematic sectional view of another example of the motor drive apparatus in accordance with the second embodiment of the invention.

FIG. 14 is a schematic sectional view of another example of the motor drive apparatus in accordance with the second embodiment, in which the motor drive control apparatus 30 is placed on the side opposite to the gear side of the electric power steering apparatus (the deceleration mechanism side), i.e., placed on the rear side of a motor 10, and integrated with the motor 10 in yet another way. The structure shown in FIG. 14 is almost the same as that in FIG. 13 except that the one screw 103 is used to fix the frame 11 of the motor 10, the heat sink 50 and the housing 40. This provides an effect of decreasing the number of components in comparison with using two screws from the both ends.

FIG. 15 is an appearance perspective view of the motor drive apparatus for facilitating understanding of the structure of the second embodiment. The perspective view in FIG. 15 corresponds to the structure shown in FIGS. 13 and 14. The boss 17 for mechanical coupling to the gear side is provided on the frond side of the motor 10. A belt on the gear box side is placed on the boss 17 and the motor 10 drives the belt and a ball screw to generate rack thrust. Depending on the structure on the gear side, a coupling may be used in place of the boss 17. The frame 11 of the motor 10 has an almost cylindrical shape and has on the front side a screw hole 53 for fixing to the gear side. In the figure, only one screw hole 53 is seen, but another screw hole 53 is provided opposite the one screw hole 53 at an angle of 180 degree from the one screw hole 53. The screw hole 52 for fixing to the heat sink 50 is provided on the rear side of the frame 11. A screw hole is also provided at the corresponding location of the heat sink 50. Furthermore, the position in the circumferential direction of the screw hole 52 for fixing the housing 40 to the heat sink 50 is the same as that of the screw hole 42 for fixing the frame 11 of the motor 10 to the housing 40. Furthermore, the screw holes 42 and 52 are placed at three locations in the circumferential direction. Regarding the fixing method, the two screws 101 and 102 opposite to each other may be used as shown in FIG. 13, or the one screw 103 may be used as shown in FIG. 14.

The abutment surface 110 between the heat sink 50 and the housing 40 is provided on a single flat plane, differing from the conventional example. The connector 90 is provided on the rear side of the housing 40. The connector 90 includes a power supply connector and a control signal connecter. But, in FIG. 15, these details are not shown. This structure improves the rigidity of the frame 11, the housing 40 and the heat sink 50, thereby providing the above-described effects including the effect of achieving both low vibration/noise and compact size of the apparatus at the same time.

Third Embodiment

FIG. 16 is a longitudinal sectional view of the motor 10 in accordance with a third embodiment of the invention. In FIG. 16, the permanent magnet 15 is attached to the surface of the rotor core 14, and the number of poles is 10. Furthermore, the permanent magnet 15 has a barrel-vaulted cross-section shape and reduces torque pulsation by reducing harmonic component of magnetic flux and making induced voltage sinusoidal. The rotor core 14 has a protrusion 14a that plays a role to fix the permanent magnet 15 from sliding in the circumferential direction.

On the other hand, the stator core 12 of the stator has a slot 12a in which the armature winding 13 is to be wound. In the example in FIG. 16, the armature winding 13 is wound intensively around a tooth 12b extending in the radial direction of the stator core 12, the number of slots is 12, and the armature winding 13 is wound around all of the 12 teeth. Furthermore, the number of phases of the armature winding 13 is three. Referring to the three phases as U-phase, V-phase and W-phase, the winding is placed as U1+, U1−, V1−, V1+, W1+, W1−, U2−, U2+, V2+, V2−, W2−, W2+, as shown in FIG. 16. Where, "+" and "−" indicate a winding direction and are opposite to each other in winding direction. Furthermore, U1+ and U1− are connected in series, and U2− and U2+ are also connected in series. These two series circuits may be connected in parallel or in series. This also applies to the V-phase and the W-phase. Also, the three phases may be connected in Y-connection or in Δ-connection.

In the 10-pole/12-slot motor 10 as described above, when three-phase AC current flows in the armature winding 13, electromagnetic exciting force that oscillates at twice the fundamental frequency and deforms the stator core 12 into an ellipse (electromagnetic exciting force with a spatial order of 2) is generated. The structure of a conventional motor drive apparatus has a problem that the electromagnetic exciting force propagates through the frame 11 of the motor 10 to the motor drive apparatus and even to the gear to increase vibration and noise. However, as shown in FIGS. 7 and 8, the number of the screw holes 42 for fixing the frame 11 of the motor 10 to the housing 40 is three, and the number of the screw holes 52 for fixing the heat sink 50 to the housing 40 is three, and furthermore, these screw holes are placed almost at 120 degree interval, so it is difficult to deform the housing 40 and the heat sink 50 into an ellipse, and even when electromagnetic exciting force is applied to deform the motor drive apparatus into an ellipse, vibration and noise can be reduced. Furthermore, the number of the screw holes 42 and 52 is not limited to three.

Figure 17:
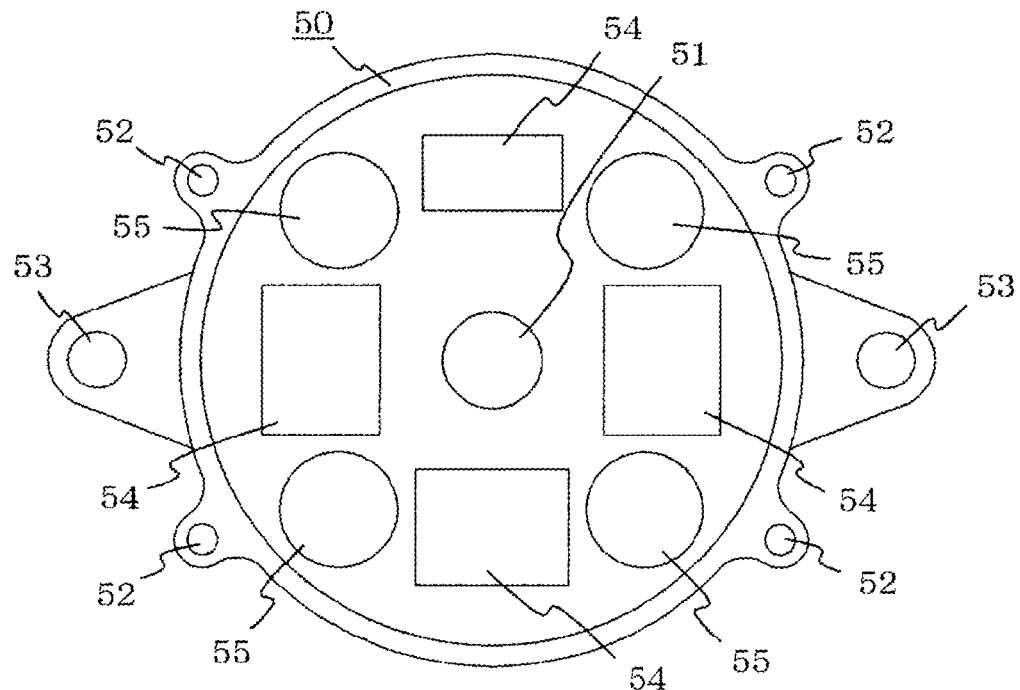
FIG. 17 is a plan view of a heat sink in accordance with the third embodiment of the invention.

FIG. 17 is a plan view of the heat sink according to the third embodiment, viewed from the rear side of the motor 10. The structure shown in FIG. 17 is almost the same as that in FIG. 7 except that the number of the screw holes 52 provided for fixing to the housing 40 is four. By providing the four screw holes 52 in this way, it is more difficult to deform the housing 40 and the heat sink 50 into an ellipse in comparison with providing the three screw holes 52, providing a larger effect of reducing vibration and noise.

Generally, assuming an M-pole/N-slot motor 10 in which the armature winding 13 is a concentrated winding, when the greatest common divisor of M and N is 2, electromagnetic exciting force that deforms the stator core 12 into an ellipse (electromagnetic exciting force with a spatial order of 2) is generated. For example, this may apply to the case of M=10 and N=12 as shown in FIG. 16, the case of M=14 and N=12 and the case of M=16 and N=18. Furthermore, it is known that, when the relation $$0.75 < N/M < 1.5$$

holds, the winding factor is higher than when N/M=0.75 or N/M=1.5, which can provide a compact and high-torque permanent magnet-type rotating electrical machine that efficiently utilizes magnetic flux of the permanent magnet 15.

Furthermore, since the least common multiple of the number of poles and the number of slots is large, the cogging torque component that pulsates the number of times corresponding to the least common multiple of the number of poles and the number of slots during one rotation of the rotor is smaller than when N/M=0.75 or N/M=1.5. Accordingly, with M poles and N slots, the greatest common divisor of M and N is 2, and $$0.75 < N/M < 1.5$$

holds, and further, the number of the screw holes 42 for fixing the frame 11 of the motor 10 to the housing 40 of the motor drive control apparatus 30 is three or more, and the number of the screw holes 52 for fixing the heat sink 50 to the housing 40 is three or more, so that both compact size/low cogging torque and low vibration/noise of the motor 10 and the motor drive control apparatus 30 can be achieved at the same time.

Furthermore, with M poles and N slots, within the range of motors in which the greatest common divisor of M and N is 2 and $$0.75 < N/M < 1.5$$

holds, the 10-pole/12-slot motor 10 shown in FIG. 16 is a motor with the least number of poles M.

For a sensor for detecting rotation angle of the rotor of the motor of a electric power steering apparatus, a variable reluctance-type resolver or a sensor combining a magnetic resistance element (GMR sensor or MR sensor) and the permanent magnet 15 is often used in consideration of low cost and environmental resistance. However, the variable reluctance-type resolver or the sensor combining a magnetic resistance element and a permanent magnet causes an error in detecting the angle, and furthermore, the value of the error varies depending on the rotation angle. Furthermore, since the value of the angle error is larger than when an optical encoder is used, the angle error causes motor torque pulsation. The cause of this is that, when an error occurs with respect to a correct rotation angle, current to flow in the armature winding 13 of the motor 10 becomes out of phase, so a desired torque is not generated. Furthermore, the larger the angle error expressed in electrical angle of the motor 10 is, the larger the torque pulsation is.

Accordingly, the motor 10 having a large number of poles raises a problem that the angle error expressed in electrical angle is also large in proportion to the number of poles, thereby increasing torque pulsation. Thus, in order to reduce torque pulsation due to the angle error, the number of poles is desirably smaller. In the case of M=10 and N=12 shown in FIG. 16, the number of poles is smaller than the case of M=14 and N=12, the case of M=16 and N=18 and the like case, which provides a particular effect of reducing torque pulsation due to the angle error of the rotation angle sensor.

Figure 18:
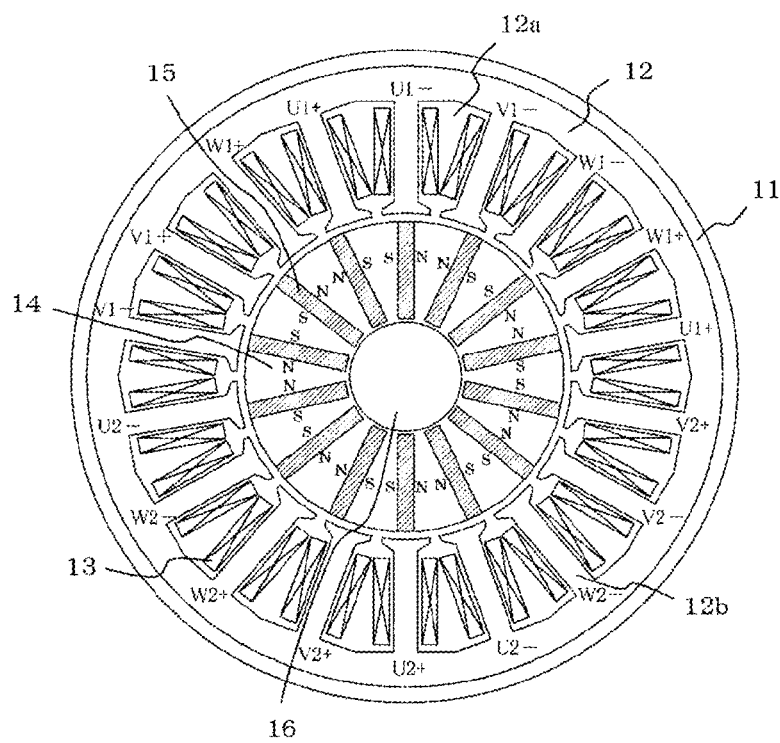
FIG. 18 is a longitudinal sectional view of another example of the motor in accordance with the third embodiment of the invention.

FIG. 18 is a longitudinal sectional view showing another example of the motor in accordance with the third embodiment, the example of M=14 and N=18. The stator core 12 of the stator has a slot in which the armature winding 13 is to be wound. In the example shown in FIG. 18, 14 permanent magnets 15 are buried in the rotor core 14 of the rotor, the permanent magnet 15 being in shape such that the length in the radial direction is larger than the thickness in the circumferential direction. Although not shown, the permanent magnet 15 is magnetized in the direction parallel to the shorter side of the rectangle of the cross section of the permanent magnet, and the polarity of one permanent magnet 15 is opposite to that of an adjacent permanent magnet 15. The permanent magnet 15 in FIG. 18 is magnetized such that the side shown as "N" becomes N-pole and the side shown as "S" becomes S-pole.

On the other hand, the armature winding 13 is wound intensively around the tooth 12b extending in the radial direction of the stator core 12, the number of slots is 18, and the armature winding 13 is wound around all of the 18 teeth. Furthermore, the number of phases of the armature winding 13 is three. Referring to the three phases as U-phase, V-phase and W-phase, the winding is placed as U1+, W1+, W1−, V1−, U1−, U1+, W1+, V1+, V1−, U2−, W2−, W2+, V2+, U2+, U2−, W2−, V2−, V2+, as shown in FIG. 18. Where, "+" and "−" indicate a winding direction and are opposite to each other in winding direction. Furthermore, U1+ and U1− are connected in series, and U2− and U2+ are also connected in series. These two series circuits may be connected in parallel or in series. This also applies to the V-phase and the W-phase. Also, the three phases may be connected in Y-connection or in Δ-connection.

In the 14-pole/18-slot motor 10 as described above, in which electromagnetic exciting force that deforms the stator core 12 into an ellipse (electromagnetic exciting force with a spatial order of 2) is generated, this structure provides an effect of reducing vibration and noise. Furthermore, the permanent magnet 15 is buried in the rotor core 14 and the length in the radial direction of the permanent magnet 15 is larger than the thickness in the circumferential direction of the permanent magnet 15, so magnetic flux can be concentrated to increase the flux density of the core, which provides an additional effect that the torque of the motor 10 is increased and the size of the motor 10 can be reduced.

Furthermore, in the rotor as shown in FIG. 18, concentrating magnetic flux may cause a problem that the flux density of the stator core 12 increases to increase electromagnetic exciting force. However, the above-described structure provides an effect of reducing vibration and noise.

Fourth Embodiment

Figure 19:
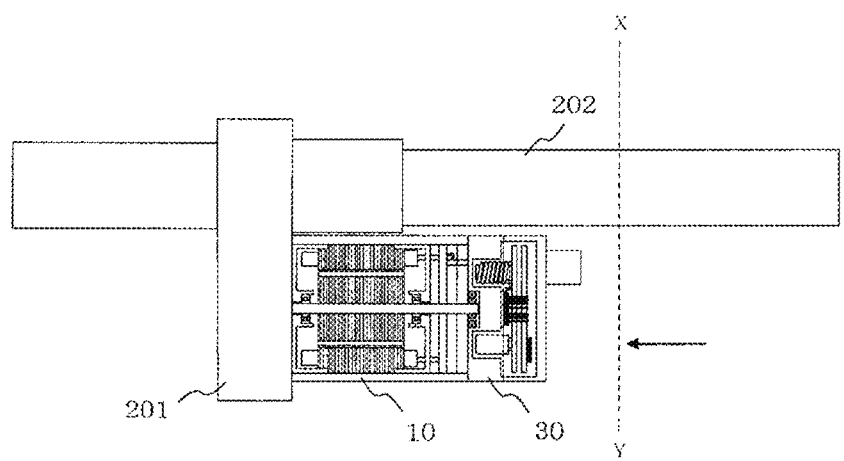
FIG. 19 is a schematic side view of the main section of an electric power steering apparatus in accordance with a fourth embodiment of the invention.
Figure 20:
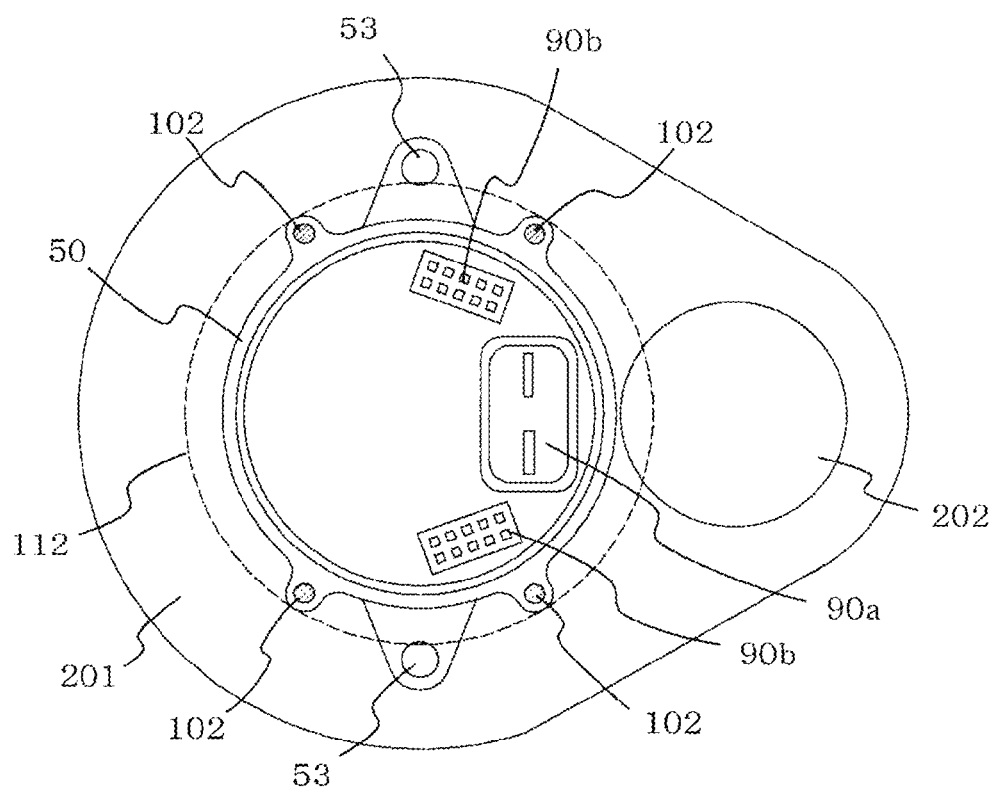
FIG. 20 is a schematic plan view of the main section of the electric power steering apparatus in accordance with the fourth embodiment of the invention.

FIG. 19 is a schematic side view of the main section of an electric power steering apparatus in accordance with a fourth embodiment of the invention, showing a rack parallel-type electric power steering apparatus in which the motor drive control apparatus 30 is placed on the rear side of the motor 10, and the motor 10 and the motor drive control apparatus 30 are placed in parallel to a rack shaft. Although not shown in detail in FIG. 19 for simplicity, a deceleration mechanism using a belt and a ball screw is provided in a gear box 201, which decelerates the rotation of the motor 10 and also converts the rotation into thrust of a rack shaft 202. FIG. 20 shows a cross section and surroundings thereof of the X-Y plane in FIG. 19 viewed from the arrow direction.

In FIG. 20, the motor drive apparatus is viewed from the rear side, so a power supply connector 90a and a control connector 90b can be seen. Furthermore, the screws 102 for fixing the heat sink 50 and the housing 40 of the motor drive control apparatus 30 are provided at four locations in the circumferential direction. This part in which the screw holes are provided defines the maximum outside diameter of the motor drive control apparatus 30 and the motor 10 (shown by a broken line 112 in FIG. 20). Furthermore, as described in the second embodiment, the positions in the circumferential direction of the screw holes for fixing the frame to the housing correspond to those for fixing the heat sink to the housing, which facilitates avoiding mechanical interference with the other components.

According to FIG. 20, the rack shaft 202 is assembled with a portion thereof inside the circle indicating the maximum outside diameter defined by the above-mentioned screw holes part, which provides an effect of achieving compact size of the electric power steering apparatus. Furthermore, as described in the first and second embodiments, the positions in the circumferential direction of the screw holes for fixing the frame to the housing correspond to those for fixing the heat sink to the housing, which provides an effect of improving rigidity and reducing vibration and noise, and further provides an effect of improving accuracy of assembling.

Fifth Embodiment

Figure 21:
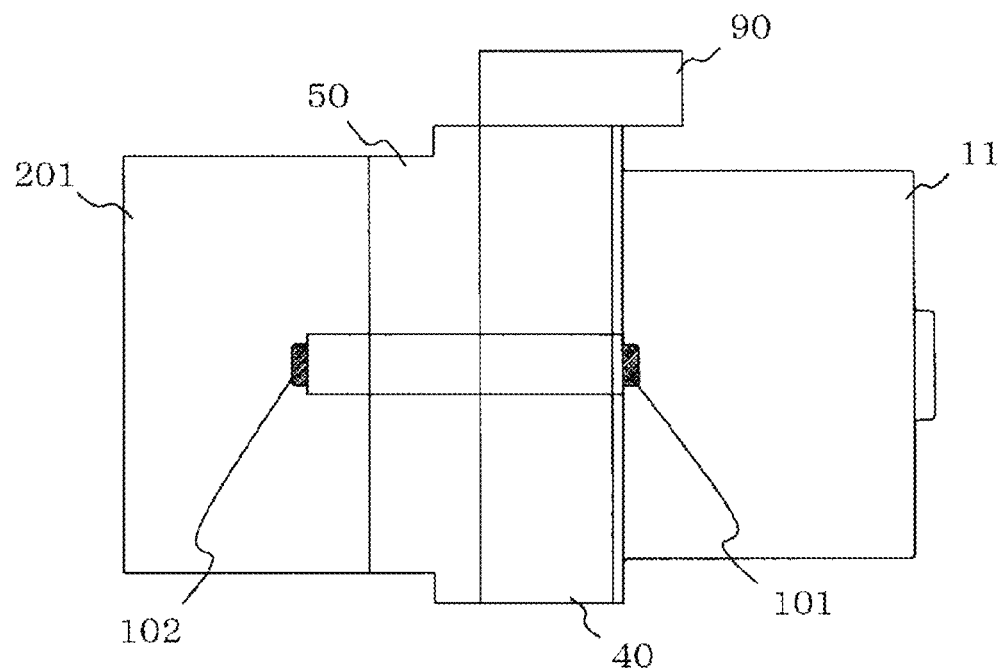
FIG. 21 is a schematic side view of an electric power steering apparatus in accordance with a fifth embodiment of the invention.

FIG. 21 is a schematic side view of an electric power steering apparatus in accordance with a fifth embodiment of the invention, in which the positions in the circumferential direction of the screw holes for fixing the gear box 201 side and the heat sink 50 correspond to those for fixing the heat sink 50, the housing 40 and the frame 11 of the motor 10. The screw 101 inserted from the frame 11 side of the motor 10 fixes the frame 11, the housing 40 and the heat sink 50 to integrate the motor 10 with the motor drive control apparatus 30. On the other hand, the screw 102 inserted from the gear box 201 side fixes the gear box 201 and the heat sink 50.

This structure provides an effect of improving the rigidity of the gear box 201, the motor drive control apparatus 30 and the motor 10 to reduce vibration and noise. Furthermore, the positions in the circumferential direction of the screw holes part of the gear box 201, the heat sink 50, the housing 40 and the frame 11 correspond to each other, which provides an effect of avoiding mechanical interference with the other components in comparison with the case in which the above-mentioned positions do not correspond to each other.

Sixth Embodiment

Figure 22:
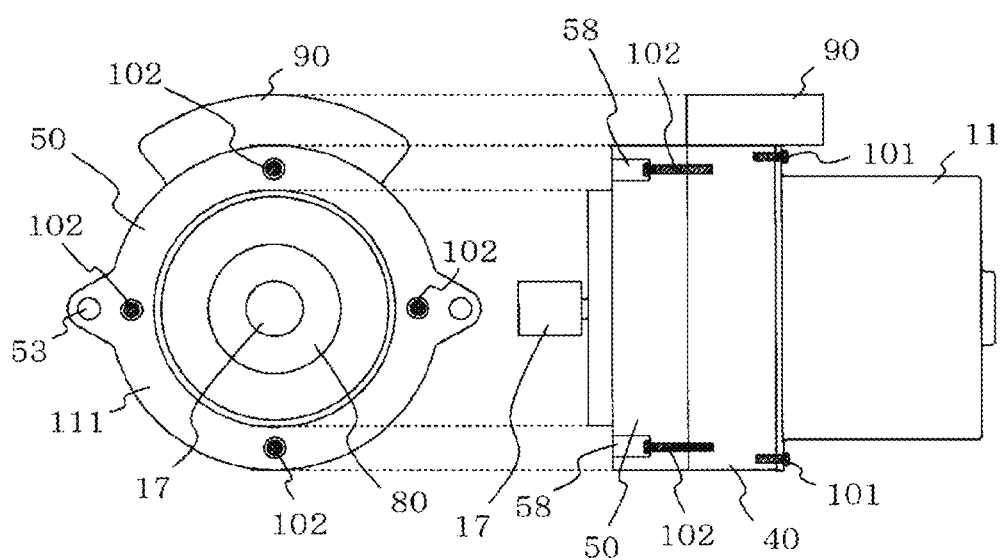
FIG. 22 is a schematic plan view and side view of a motor drive apparatus in accordance with a sixth embodiment of the invention.

FIG. 22 is a schematic plan view and side view of a motor drive apparatus in accordance with a sixth embodiment, in which the contact area of the abutment surface 111 between the gear box 201 side and the heat sink 50 is expanded. The right portion of FIG. 22 is a side view of the motor 10 and the motor drive control apparatus 30. The left portion of FIG. 22 is a front view of the same. This differs from FIG. 2 in that the screw 102 that fixes the heat sink 50 to the housing 40 is placed more inwardly in the radial direction by a predetermined distance in comparison with FIG. 2 and in that a hole 58 for containing the screw 102 is provided in the heat sink 50. Although the screw 102 for fixing the heat sink 50 to the housing 40 and the screw 101 for fixing the frame 11 to the housing 40 are not seen from the side, FIG. 21 shows those screws for facilitating understanding.

As seen from the left portion of FIG. 22, the area of the abutment surface 111 at which the gear box 201 side is in contact with the heat sink 50 is larger. This structure provides an effect of efficiently propagating heat from the heat sink 50 to the gear box side to suppress temperature increase of the motor drive control apparatus 30.

Furthermore, as has been described in the embodiments, the positions in the circumferential direction of the screw holes for fixing the frame to the housing correspond to those for fixing the heat sink to the housing, which provides an effect of improving rigidity and reducing vibration and noise, and further provides an effect of improving accuracy of assembling and an effect of avoiding mechanical interference with the other components.

Seventh Embodiment

FIG. 23 is a plan view of a heat sink of a motor drive control apparatus in accordance with a seventh embodiment of the invention, in which the heat sink 50 of the motor drive control apparatus 30 is viewed from the front side. The boss 17 and the resolver 80 as a rotation sensor are also shown. Flanges 56 for attaching to the gear box 201 side is provided at two locations opposite to each other with an angle of 180 degrees in between, each flange 56 including one screw hole 53. Furthermore, the screw hole 52 for fixing the heat sink 50 to the housing 40 is provided in this flange 56. By providing a concave area 52a that is recessed in the direction of the motor rotation axis, the area around the screw hole 52 is one level lower to keep the screw from contact with the gear box. The screw holes 52 are provided at two locations in each flange 56, or at four locations in total. Providing the screw holes 52 at four locations provides an effect of improving rigidity and reducing vibration and noise.

With this structure, the contact area with the gear side is large, which improves mechanical rigidity and reduces vibration and noise. Furthermore, the screw hole 52 for fixing the heat sink 50 to the housing 40 is provided in the flange 56, which provides an effect of allowing compact size and avoiding mechanical interference with the other components when assembling. Furthermore, the structure in which the area of the abutment surface 111 at which the gear box side is in contact with the heat sink is larger provides an effect of efficiently propagating heat from the heat sink 50 to the gear box side to suppress temperature increase of the motor drive control apparatus 30.

| Reference Signs List | | |
|---|---|---|
| 10: motor | | |
| 11: frame | 11a: screw hole | |
| 12: stator core | 12a: slot | 12b: teeth |
| 13: armature winding | 13a: terminal | |
| 14: rotor core | 14a: protrusion | |
| 15: permanent magnet | | |
| 16: shaft | | |
| 17: boss | | |
| 18, 19: bearing | | |
| 20, 21: cover | | |
| 30: motor drive control apparatus | | |
| 40: housing | | |
| 41: hole for inserting a shaft | | |
| 42: screw hole for coupling to a heat sink | | |
| 43: hole for inserting a bus bar | | |
| 50: heat sink | | |
| 51: hole for inserting a shaft | | |
| 52: screw hole for coupling to a housing | | |
| 53: hole for coupling to a gear side | | |
| 54: switching element placement section | | |
| 55: hole for containing a smoothing capacitor and coil | | |
| 56: flange | | |
| 57: cover | | |
| 58: hole | | |
| 60: control board | | |
| 61: hole for inserting a shaft | | |
| 62: hole for inserting a control signal line | | |
| 63: hole for inserting a terminal | | |
| 64: microcomputer | | |
| 65: FET drive circuit | | |
| 70: electric connection | | |
| 71: hole for inserting a shaft | | |
| 72: frame | | |
| 73: switching element | 73a, 73b, 73c: FET | |
| 73d: shunt resistor | 73e: motor side terminal | |
| 73f: (+) side terminal | 73g: (−) side terminal | |
| 73h: control signal line | | |
| 74: smoothing capacitor | | |
| 75: coil | | |
| 76: power supply relay | 76a, 76b: FET | |
| 76c: control signal line | | |
| 77: (+) side bus bar | | |
| 78: (−) side bus bar | | |
| 79: terminal | | |
| 80: resolver | | |
| 90: connector | 90a: power supply connector | |
| 90b: control connector | | |
| 100: battery | | |
| 101: screw for coupling a frame and a housing | | |
| 102: screw for coupling a housing and a heat sink | | |
| 103: screw for coupling a frame, a housing and a heat sink | | |
| 110: abutment surface between a housing and a heat sink | | |
| 111: abutment surface between a gear and a heat sink | | |
| 112: circle indicating maximum diameter of a motor | | |
| 201: gear box | | |
| 202: rack shaft | | |

The invention claimed is:

1. A motor drive apparatus integrally comprising: a motor contained in a frame; and a motor drive control apparatus, placed in the direction of the rotation axis of the motor, for performing drive control of the motor,
wherein the motor drive control apparatus comprises:
a heat sink, on which a switching element for performing drive control of the motor is mounted, placed on the front side or the rear side of the motor; and a housing coupled to the heat sink, and
wherein an abutment surface between the housing and the heat sink extends continuously around the housing and the heat sink and is located on a single plane intersecting with the direction of the rotation axis of the motor, and screw holes for coupling the frame, the heat sink and the housing to each other are formed in the frame, the heat sink and the housing and provided such that the positions in the circumferential direction of the screw holes correspond to each other.

2. The motor drive apparatus according to claim 1, wherein the motor has one or more bearings, and at least one of the bearings is placed on the front side of the motor with respect to the abutment surface between the housing and the heat sink.

3. The motor drive apparatus according to claim 1, wherein the housing and the heat sink are placed as two separate components and placed in the direction of the rotation axis of the motor.

4. The motor drive apparatus according to claim 1, wherein the heat sink, the housing and the frame are coupled using separate screws from both side in the direction of the rotation axis of the motor.

5. The motor drive apparatus according to claim 1, wherein the heat sink, the housing and the frame are coupled using a common screw from one side in the direction of the rotation axis of the motor.

6. The motor drive apparatus according to claim 1, wherein the bearing surface of the screw for coupling the heat sink and the housing is positioned nearer the rear side of the motor with respect to a connection between a gear box coupled to a shaft of the motor and the heat sink.

7. The motor drive apparatus according to claim 1, wherein the motor drive control apparatus is placed on the front side of the motor.

8. The motor drive apparatus according to claim 7, wherein the screw that couples the heat sink and the housing is placed more inwardly in the radial direction by a predetermined distance with respect to the maximum outside diameter of the housing.

9. The motor drive apparatus according to claim 7, wherein the position in the circumferential direction of the screw hole for coupling a gear box coupled to a shaft of the motor and the heat sink corresponds to that of the screw hole for coupling the frame, the housing and the heat sink.

10. The motor drive apparatus according to claim 9, wherein a hole for the screw is provided in the heat sink.

11. The motor drive apparatus according to claim 7, wherein the heat sink has a flange for attaching to a gear box, the flange including a screw hole for a screw for coupling the heat sink and the housing.

12. The motor drive apparatus according to claim 1, wherein the motor drive control apparatus is placed on the rear side of the motor.

13. The motor drive apparatus according to claim 1, wherein in the heat sink, a plurality of switching element placement sections on which the switching elements are placed are placed to surround the rotation axis of the motor.

14. The motor drive apparatus according to claim 1, wherein, for the motor, with M poles and N slots (M is an integer, N is an integer),
the greatest common divisor of M and N is 2, and the relation:

$$0.75 < N/M < 1.5$$

holds, and further, the screw holes for coupling the frame, the housing and the heat sink are provided at three or more locations in the circumferential direction.

15. The motor drive apparatus according to claim 14, wherein the motor has M=10 poles and N=12 slots,
and, for a sensor for detecting rotation angle of the rotor of the motor, has a variable reluctance-type resolver or a sensor including a magnetic resistance element and a permanent magnet.

16. The motor drive apparatus according to claim 14, wherein the motor has M=14 poles and N=18 slots,
a permanent magnet is buried in the rotor core, and the length in the radial direction of the permanent magnet is larger than the thickness in the circumferential direction of the permanent magnet.

17. An electric power steering apparatus comprising the motor drive apparatus according to claim 1, wherein a portion of the electric power steering apparatus is assembled within the range of the maximum outside diameter defined by a screw hole of a screw for coupling the frame of the motor and the housing of the motor drive control apparatus.

18. A motor drive apparatus integrally comprising: a motor contained in a frame; and a motor drive control apparatus, placed in the direction of the rotation axis of the motor, for performing drive control of the motor,
wherein the motor drive control apparatus comprises:
a heat sink, on which a switching element for performing drive control of the motor is mounted, placed on the front side of the motor; and
a housing, placed between the heat sink and the frame, for coupling the heat sink to the frame and covering the switching element mounted on the heat sink, and
wherein an abutment surface between the housing and the heat sink extends continuously around the housing and the heat sink and is located on a single plane intersecting with the direction of the rotation axis of the motor, and screw holes for coupling the frame, the heat sink and the housing to each other are formed in the frame, the heat sink and the housing and provided such that the positions in the circumferential direction of the screw holes correspond to each other.

19. A motor drive apparatus integrally comprising: a motor contained in a frame; and a motor drive control apparatus, placed in the direction of the rotation axis of the motor, for performing drive control of the motor,
wherein the motor drive control apparatus comprises:
a heat sink, on which a switching element for performing drive control of the motor is mounted, placed on the rear side of the motor; and
a housing, placed between the heat sink and the frame, for coupling the heat sink to the frame, and
wherein an abutment surface between the housing and the heat sink extends continuously around the housing and the heat sink and is located on a single plane intersecting with the direction of the rotation axis of the motor, and screw holes for coupling the frame, the heat sink and the housing to each other are formed in the frame, the heat sink and the housing and provided such that the positions in the circumferential direction of the screw holes correspond to each other.

20. A motor drive apparatus integrally comprising: a motor contained in a frame; and a motor drive control apparatus, placed in the direction of the rotation axis of the motor, for performing drive control of the motor,
wherein the motor drive control apparatus comprises:
a heat sink, on which a switching element for performing drive control of the motor is mounted, placed on the rear side of the motor; and
a housing placed opposite the motor side of the heat sink and coupled to the heat sink to surround the switching element, and
wherein an abutment surface between the housing and the heat sink extends continuously around the housing and the heat sink and is located on a single plane intersecting with the direction of the rotation axis of the motor, and a plurality of screw holes for coupling the frame, the heat sink and the housing to each other are formed in the frame, the heat sink and the housing and provided such that the positions in the circumferential direction of the screw holes correspond to each other.

* * * * *